United States Patent
Mirvakili et al.

(10) Patent No.: US 11,892,015 B2
(45) Date of Patent: Feb. 6, 2024

(54) WIRELESS ACTUATORS

(71) Applicant: Massachusetts Institute of Technology, Cambridge, MA (US)

(72) Inventors: Seyed M. Mirvakili, Quincy, MA (US); Ian W. Hunter, Lincoln, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 431 days.

(21) Appl. No.: 17/284,243

(22) PCT Filed: Oct. 10, 2019

(86) PCT No.: PCT/US2019/055658
§ 371 (c)(1),
(2) Date: Apr. 9, 2021

(87) PCT Pub. No.: WO2020/077102
PCT Pub. Date: Apr. 16, 2020

(65) Prior Publication Data
US 2021/0355972 A1  Nov. 18, 2021

Related U.S. Application Data

(60) Provisional application No. 62/743,606, filed on Oct. 10, 2018.

(51) Int. Cl.
*F15B 15/10* (2006.01)
*F15B 21/06* (2006.01)
(Continued)

(52) U.S. Cl.
CPC ........ *F15B 15/103* (2013.01); *F15B 15/1485* (2013.01); *F15B 21/065* (2013.01);
(Continued)

(58) Field of Classification Search
CPC  F15B 15/103; F15B 2015/208; F15B 21/065; F15B 2211/885; H01F 1/445; H01F 1/447
See application file for complete search history.

(56) References Cited

U.S. PATENT DOCUMENTS

| 6,168,634 B1 | 1/2001 | Schmitz |
| 8,349,020 B2 * | 1/2013 | Majoe ............... F15B 15/10 92/92 |

(Continued)

FOREIGN PATENT DOCUMENTS

WO   2009/077785   6/2009

OTHER PUBLICATIONS

Hines, Lindsey et al.; "Soft Actuators for Small-Scale Robotics", Advanced Materials, vol. 29, No. 13, Apr. 1, 2017; 43 pp.
(Continued)

*Primary Examiner* — Michael Leslie
(74) *Attorney, Agent, or Firm* — PABST PATENT GROUP LLP

(57) ABSTRACT

A method of performing wireless actuation by inductive heating of magnetic particles. The method provides a bladder having an inner surface and an outer surface, the inner surface forming an interior area, the bladder configured to expand or retract so as to change an area of the interior area, (ii) a plurality of magnetic particles suspended in a fluid medium and disposed within the interior area, and (iii) a sleeve disposed on the outer surface of the bladder. The method excites the plurality of magnetic particles by application of an alternating magnetic field to which the particles reaction. The method causes, by the excited magnetic particles, a phase transition to the fluid medium within the interior area which causes the bladder to expand, such that the sleeve confining the bladder generates actuation from the expansion or retraction of the bladder.

19 Claims, 27 Drawing Sheets

(51) Int. Cl.
*H01F 1/44* (2006.01)
*F15B 15/20* (2006.01)
*F15B 15/14* (2006.01)
*B25J 9/14* (2006.01)

(52) U.S. Cl.
CPC ............ *H01F 1/445* (2013.01); *H01F 1/447* (2013.01); *B25J 9/142* (2013.01); *F15B 2015/208* (2013.01); *F15B 2211/885* (2013.01)

(56) References Cited

U.S. PATENT DOCUMENTS

| | | | | |
|---|---|---|---|---|
| 8,446,065 | B2* | 5/2013 | Browne | F15B 15/10 |
| | | | | 310/369 |
| 8,904,919 | B2* | 12/2014 | Woods | F15B 15/103 |
| | | | | 92/92 |
| 9,133,864 | B2* | 9/2015 | Menon | F15B 15/10 |
| 2006/0097232 | A1* | 5/2006 | Hakata | H01F 1/447 |
| | | | | 252/570 |
| 2022/0001530 | A1* | 1/2022 | Sameoto | B32B 27/283 |
| 2022/0065271 | A1* | 3/2022 | Langer | F15B 15/103 |

OTHER PUBLICATIONS

European Patent Office; International Search Report and Written Opinion for PCT application No. PCT/US2019/055658; dated Jan. 29, 2020; 15 pp.

* cited by examiner

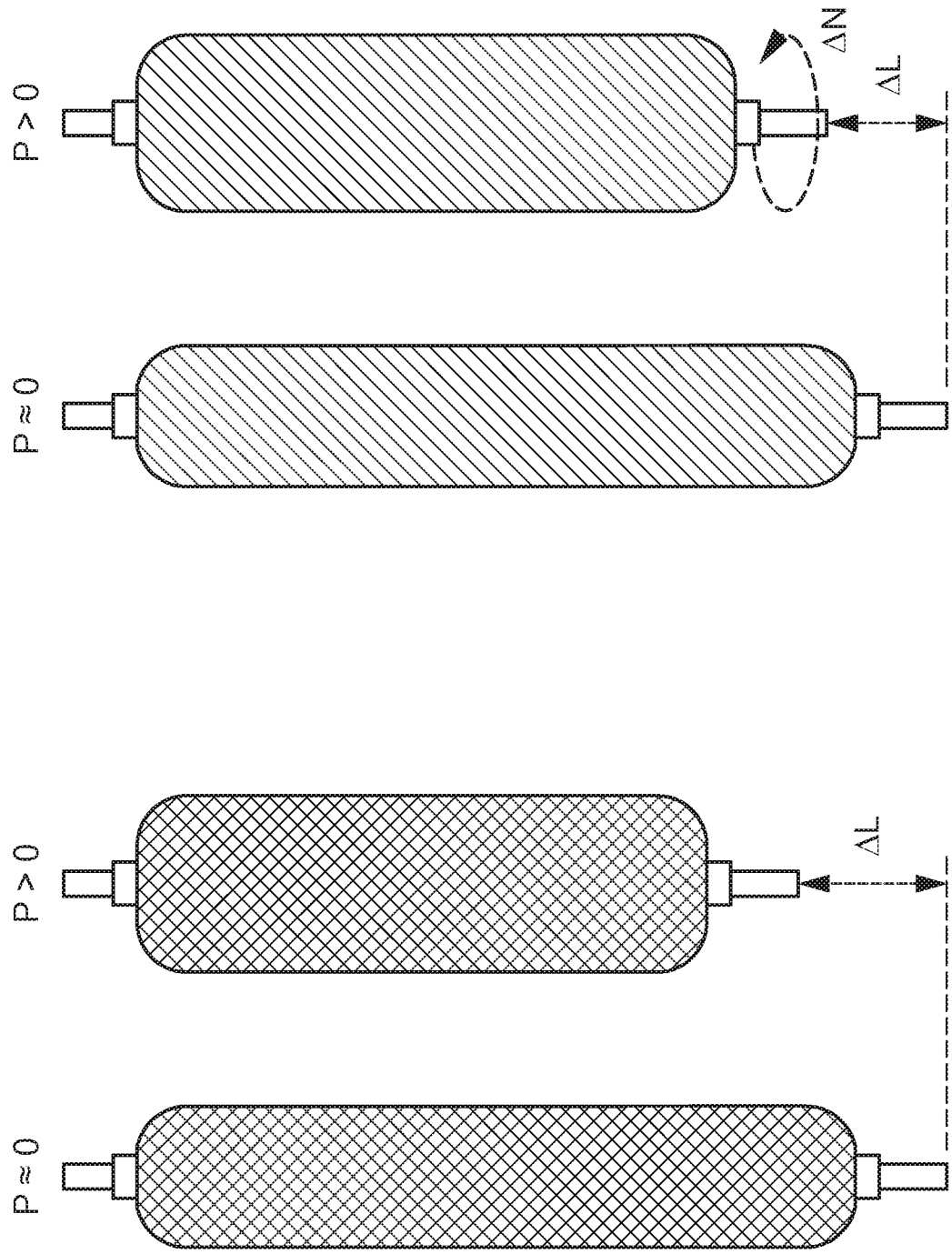

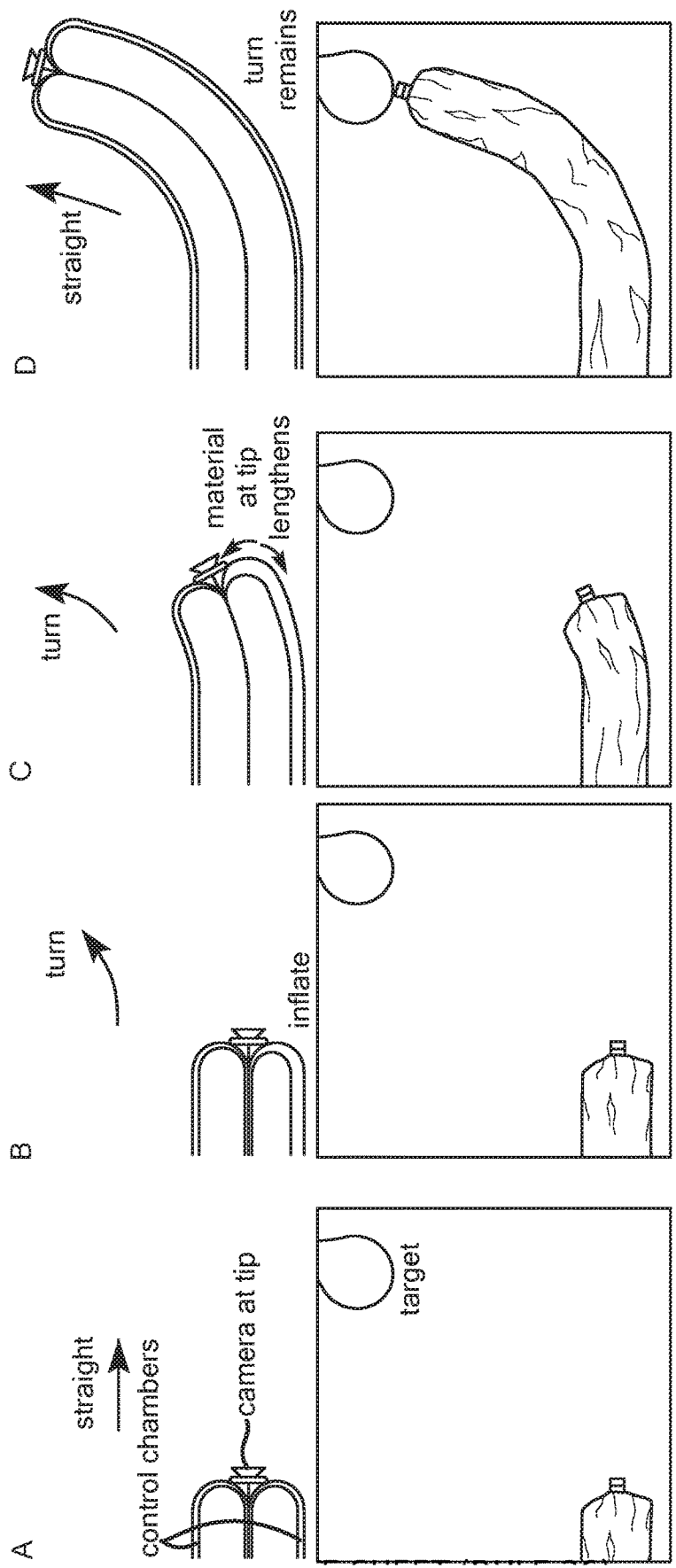

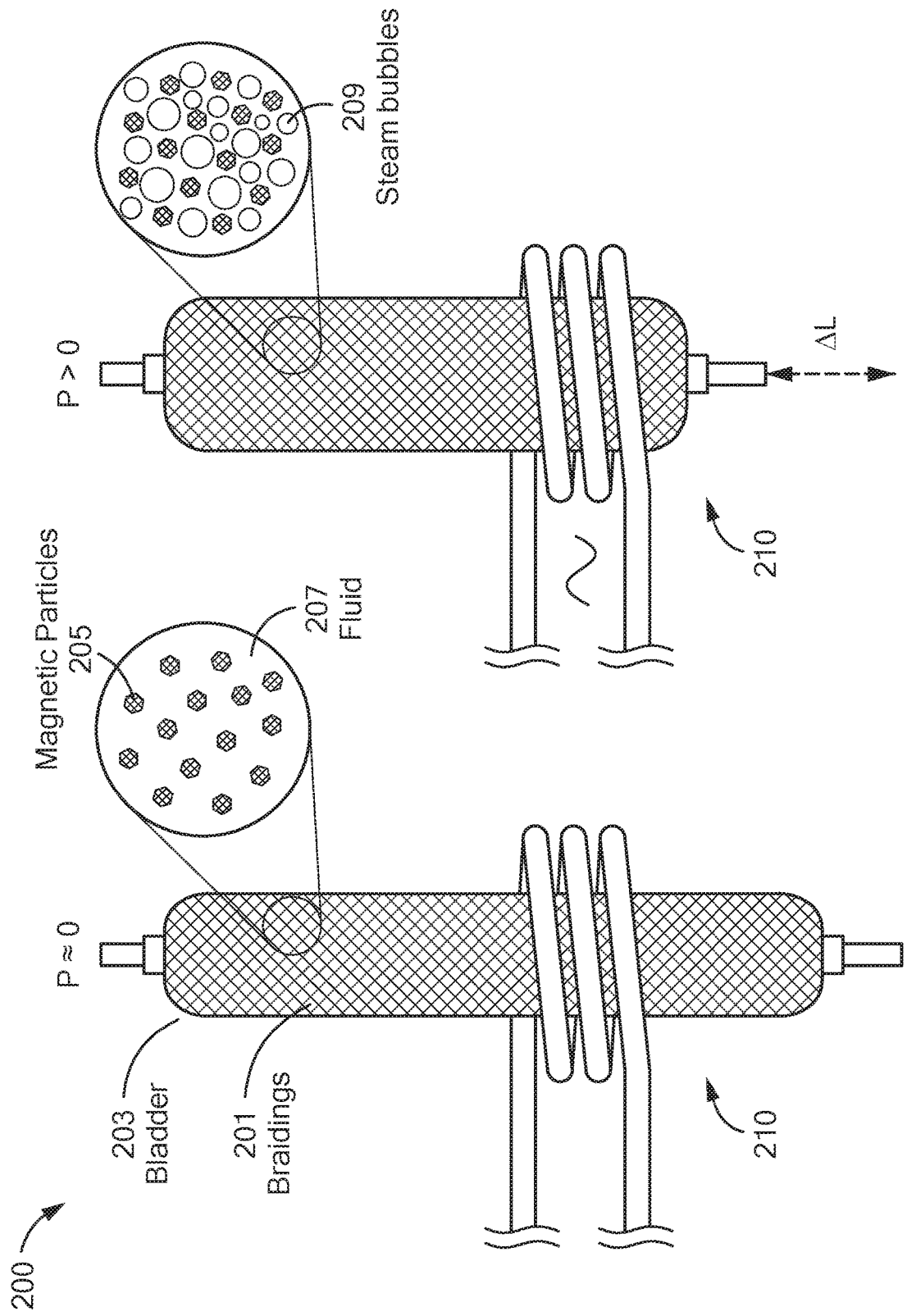

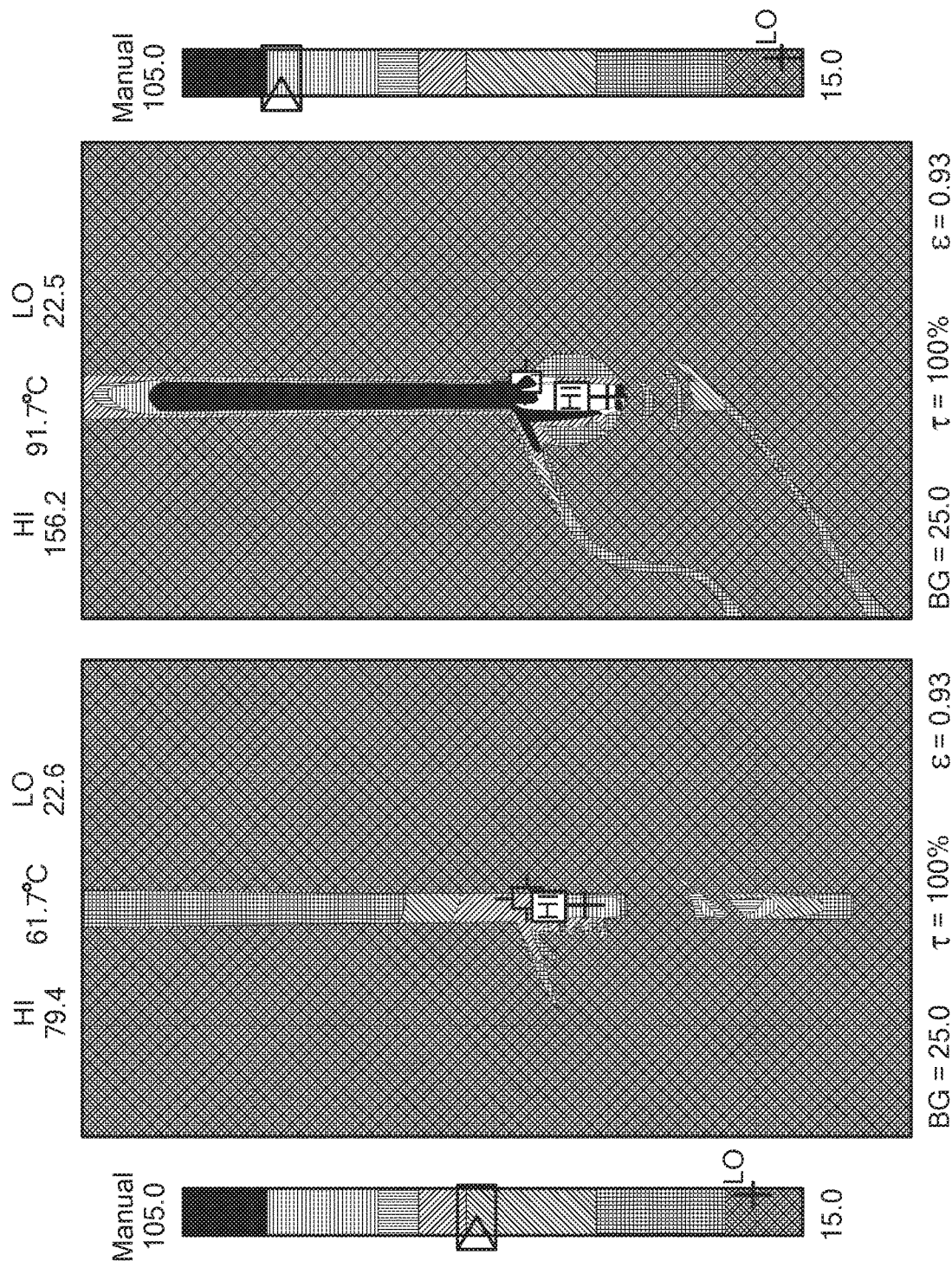
*Fig. 4C*    *Fig. 4D*

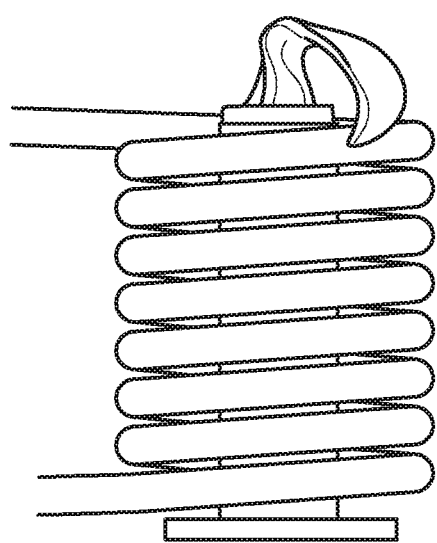 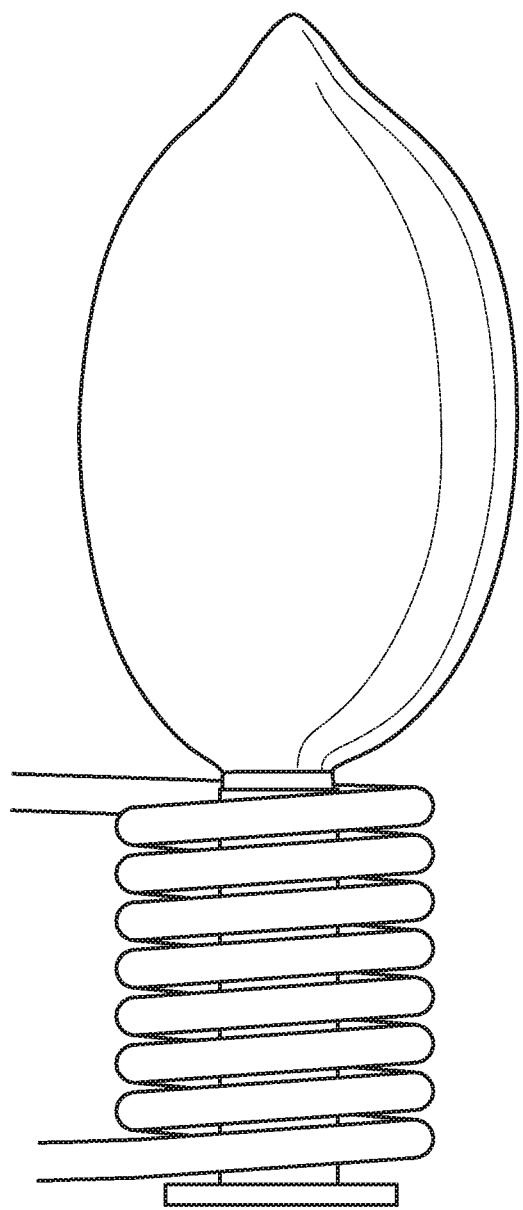
*Fig. 4E*  *Fig. 4F*

Single Domain Magnetic Particles

Néel Relaxation

Brownian Relaxation

Multi-domain Magnetic Particles

Multi-domain Ferrimagnetic Particles

WIRELESS ACTUATORS

PRIORITY

This application is the national phase entry of International Patent Application No. PCT/US2019/055658 filed Oct. 10, 2019, which claims priority from U.S. Provisional Patent Application 62/743,606, filed Oct. 10, 2018, the disclosures of which are incorporated herein by reference in their entirety.

TECHNICAL FIELD

The present invention relates to thermal and pneumatic actuators and methods for manufacturing and using them, and, more particularly, to governing such actuators by induction heating.

BACKGROUND ART

Artificial muscles are materials or devices that can reversibly contract, expand, or rotate within a single integral structure due to an external stimulus (such as voltage, current, pressure or temperature).

Mimicking muscle-generated movements—such as locomotion, lifting, rotation, and bending—have been of a great interest for application in robotics and electromechanical systems, in a broader scheme, as discussed in S. M. Mirvakili et al., "*Artificial Muscles: Mechanisms, Applications, and Challenges*," Adv. Mater., vol. 30, 1704407 (2018), incorporated herein by reference. To address this need, several categories of muscle-like actuators (known as artificial muscles) have been developed over the past several decades. Shape memory materials (as discussed in S. M. Mirvakili et al., "*Fast Torsional Artificial Muscles from NiTi Twisted Yarns*," ACS Appl. Mater. Interfaces, vol. 9, 16321-16326 (2017), incorporated herein by reference), dielectric elastomers (as discussed in E. Acome et al., "*Hydraulically amplified self-healing electrostatic actuators with muscle-like performance*," Science, vol. 359, 61-65 (2018), hereinafter "Acome," incorporated herein by reference), hydraulic actuators (as discussed in Acome), highly oriented thermoresponsive polymers (as discussed in C. S. Haines et al., "*Artificial Muscles from Fishing Line and Sewing Thread*," Science, 343, 868-872 (2014) and in S. M. Mirvakili et al., "*Multidirectional Artificial Muscles from Nylon*," Adv. Mater., 29, 1604734 (2017), each incorporated herein by reference), conducting polymers, ionic polymer metal composites, and pneumatic actuators are among the highly developed materials for artificial muscles.

Owing to its design simplicity, pneumatic artificial muscles (PAMs, similar to hydraulic actuators) are among the most industrially applied and highly developed actuators. Pneumatic artificial muscles, in general, are made of a compliant bladder confined within a braided jacket, as in the McKibben artificial muscle depicted in FIGS. 1A-D. McKibben artificial muscle, invented in the 1950's, is one of the early examples of soft pneumatic actuators which is made of a compliant bladder confined within a braided jacket. In FIGS. 1A-B, asymmetric braiding is shown that creates linear actuation when the bladder is pressurized. FIG. 1A shows the bladder with the asymmetric braiding before pressurization, and FIG. 1B shows the bladder with the asymmetric braiding after pressurization. In FIGS. 1C-D, removing one family of braids enables torsional actuation. FIG. 1C shows the bladder with such braids removed before pressurization, and FIG. 1D shows the bladder with such braids removed after pressurization.

Bending, torsional, and linear actuation have been demonstrated with PAMs, as discussed in Belding et al., "*Slit Tubes for Semisoft Pneumatic Actuators*," Adv. Mater., vol. 30, 1704446 (2018), incorporated herein by reference. Pneumatic artificial muscles can generate power densities of up to 10 kW/kg and are relatively easy to make. Over the past decade, more advanced and integrated designs have been proposed for pneumatic artificial muscles and are usually categorized within the field of soft robotics. The actuation mechanism in soft robots is very similar to that of pneumatic artificial muscles in that a pressurized soft expandable material generates bending, torsional, and linear actuation. Robotic grippers and in general robotic arms are among the widely researched PAMs due to their potential of being widely deployed in industry, with examples shown in FIGS. 1K and 1L. FIG. 1K depicts a FlexShapeGripper by Festo AG & Co. KG. This gripping mechanism is inspired by the tongue of a chameleon. FIG. 1L shows a Bionic motion robotic arm by Festo.

PAMs can generate up to 36% strain, mainly limited by the rigidity and geometry of their inflated membranes. However, new designs have recently enhanced the performance in different aspects such as strain, manufacturability, and generating wide range of motions. For example, inspired by origami structures, it has been shown that linear contractions of 90% can be achieved by applying negative pressures of 60 kPa to an origami skeleton with a symmetrical zigzag geometry, as depicted in FIGS. 1E (before negative pressure applied) and 1F (after negative pressure applied), reproduced from Li et al., "*Fluid-driven origami-inspired artificial muscles*," PNAS, 201713450 (2017) (hereinafter, "Li 2017"), which is incorporated herein by reference. According to Li 2017, these structures have demonstrated stresses of 600 kPa and peak power densities of around 2 kW/kg. Torsional and bending actuation functionalities have also been demonstrated by these structures. Also see R. L. Truby et al., "*Soft Somatosensitive Actuators via Embedded 3D Printing*," Adv. Mater., (2018) and Roche Ellen T. et al., "*A Bioinspired Soft Actuated Material*," Adv. Mater., vol. 26, 1200-1206 (2014), each incorporated herein by reference.

An interesting approach, inspired by plant growth, has been recently proposed by Hawkes et al., "*A soft robot that navigates its environment through growth*," Sci. Robot, vol. 2, eaan3028 (2017) (hereinafter, "Hawkes 2017"), incorporated herein by reference, which employs internal pressure to increase the displacement of a robotic arm. This robotic arm generates non-reversible actuation and can navigate its environment through growth, as depicted in FIGS. 1G-1J, reproduced from Hawkes 2017. FIG. 1G shows an implementation of artificial muscles in a soft robot that uses small pneumatic control chambers and a camera mounted on the tip for visual feedback of the environment. The camera is held in place by a cable running through the body of the robot. To queue an upward turn, the lower control chamber is inflated, as shown in FIG. 1H. As the body grows in length, material on the inflated side lengthens as it everts, as shown in FIG. 1I, resulting in an upward turn, as shown in FIG. 1J. Hawkes 2017 reported that a 0.28 m long arm can extend to 72 m, limited by the amount of compliant membrane on the spool.

Recently, new fabrication techniques such as molding and 3D printing have been used to fabricate PAMs that can generate bending and/or torsional actuation in addition to linear actuation. By using molding fabrication techniques, it has been shown that tunable biomimetic motion (mimicking the twisting motion of the heart during contraction) can be achieved by embedding pneumatic artificial muscles in a soft matrix. Thanks to the recent advances in 3D printing technologies, pneumatic artificial muscles and sensors now can be easily integrated into the design of soft robots. For example, miniature autonomous robots and soft somatosensitive actuators have been demonstrated using multi-material embedded 3D printing techniques.

One of the current key challenges that pneumatic artificial muscles for portable devices have been facing is the weight/size of the required equipment (e.g., compressors, valves, pump or pressurized cylinder). For untethered applications, aside from supplying gas from a pressurized source, several novel techniques have been explored including some involving phase change materials (e.g., liquid-vapor transition of ethanol), combustion (e.g., butane and oxygen), as discussed in N. W. Bartlett et al., "*A 3D-printed, functionally graded soft robot powered by combustion,*" Science, vol. 349, 161-165 (2015), incorporated herein by reference; and gas evolution reactions (e.g., decomposition of hydrogen peroxide with platinum catalyst or consumption of oxygen and hydrogen with a fuel cell to make vacuum, or generating $CO_2$ from urea with a catalyzer), as discussed in M. Wehner et al., "*An integrated design and fabrication strategy for entirely soft, autonomous robots,*" Nature, vol. 536, 451-455 (2016) and T. M. Sutter et al., "*Rubber muscle actuation with pressurized $CO_2$ from enzyme-catalyzed urea hydrolysis,*" Smart Mater. Struct., 22, 094022 (2013), each incorporated herein by reference; chemically activating swelling/de-swelling (e.g., pH-sensitive hydrogels), as discussed in B. Tondu et al., "*A pH-activated artificial muscle using the McKibben-type braided structure,*" Sens. Actuators Phys., 150, 124-130 (2009); and phase change materials (e.g., ethanol and paraffin wax), as discussed in A. Miriyev et al., "*Soft material for soft actuators,*" Nat. Commun., vol. 8, 596 (2017), Z. Zhou et al., "*A large-deformation phase transition electrothermal actuator based on carbon nanotube-elastomer composites,*" J. Mater. Chem. B., vol. 4, 1228-1234 (2016), B. Liu et al., "*A thermal bubble micro-actuator with induction heating,*" Sens. Actuators Phys., 222, 8-14 (2015), and D. Sangian et al., "*Thermally activated paraffin-filled McKibben muscles,*" J. Intell. Mater. Syst. Struct., vol. 27, 2508-2516 (2016), each incorporated herein by reference. Phase changes in liquids, such as ethanol, can generate reversible actuation. Indeed, it has been demonstrated that linear expansions of up to 140% (900% unconstrained) with stresses of up to 1.3 MPa can be generated from a Joule heated porous polymeric matrix filled with ethanol. Most combustion and chemical reaction techniques are irreversible; therefore, the fuel should be replenished after several cycles. In contrast, phase change materials can reversibly generate volumetric expansion. For negative pressure operating actuators (having structures similar to accordion bellows), mechanisms involving a reduction in the number of gas molecules can be exploited. Examples are hydrogen fuel cells, oxidizers, and heating-cooling techniques for generating vacuums.

Inductive activation of actuators through thermal mechanisms involving shape memory polymer has been discussed by Buckley et al., "*Inductively Heated Shape Memory Polymer for the Magnetic Actuation of Medical Devices,*" Hatsopoulos Microfluids Laboratory Report, MIT (February 2006), incorporated herein by reference.

SUMMARY OF THE EMBODIMENTS

In accordance with one embodiment of the invention, a device for wireless actuation includes a bladder having an inner surface and an outer surface. The inner surface forms an interior area, and the bladder is configured to expand or retract so as to change an area of the interior area. The device also includes a plurality of magnetic particles suspended in a fluid medium and disposed within the interior area. The plurality of magnetic particles configured to react to an alternating magnetic field which causes a phase transition to the fluid medium within the interior area and causes the bladder to expand. The device further includes a sleeve disposed on the outer surface of the bladder. The sleeve is configured to confine the bladder so as to generate actuation from the expansion or retraction of the bladder.

In some embodiments, the magnetic particles may be configured to heat in reaction to the alternating magnetic field and the heat of the magnetic particles causes the phase transition to the fluid medium. The plurality of magnetic particles may be heated by the alternating magnetic field inducing a current within a set of the plurality of magnetic particles. In some embodiments, the current may be an eddy current. In some embodiments, the plurality of magnetic particles may be heated by the alternating magnetic field causing one or more of hysteresis losses, Brownian relaxation, or Néel relaxation. In some embodiments, the phase transition may include generating steam within the interior area by the heated magnetic particles boiling the fluid medium within the interior area, such that the steam causes the bladder to expand within the sleeve. In some embodiments, the bladder may be expanded due to pressure caused by the steam within the interior area, and due to confinement of the bladder within the sleeve, the expansion or retraction of the bladder generates the actuation.

In some embodiments, the bladder may be made of latex material. In some embodiments, the plurality of magnetic particles may be microparticles or nanoparticles. In some embodiments, the plurality of magnetic particles may comprise one or more of: iron, iron oxide, nickel, nickel oxide, cobalt and/or cobalt oxide. In some embodiments, the plurality of magnetic particles may comprise $Fe_3O_4$. In some embodiments, the sleeve may be made of braided carbon fiber. In some embodiments, the fluid medium is a low boiling point liquid. In some embodiments, the fluid medium may be deionized (DI) water, carbonated water, or ethanol. In some embodiments, the alternating magnetic field may be a high frequency alternating magnetic field. In some embodiments, the plurality of magnetic particles may be coated with a coating material to prevent agglomeration. In some embodiments, the coating material may include one or more polymers, such as methoxy-PEG-silane.

In accordance with one embodiment of the invention, a wireless actuation system includes the device described above and a magnetic field generator configured to generate an alternating magnetic field.

In accordance with a further embodiment of the invention, a method of wireless actuation includes providing (i) a bladder having an inner surface and an outer surface, the inner surface forming an interior area, the bladder configured to expand or retract so as to change an area of the interior area, (ii) a plurality of magnetic particles suspended in a fluid medium and disposed within the interior area, and (iii) a sleeve disposed on the outer surface of the bladder. The method also includes exciting the plurality of magnetic particles by application of an alternating magnetic field to which the plurality of magnetic particles react. The method further includes causing, by the excited magnetic particles, a phase transition to the fluid medium within the interior area which causes the bladder to expand, such that the sleeve confining the bladder generates actuation from the expansion or retraction of the bladder.

In some embodiments, exciting may include heating the magnetic particles in reaction to the alternating magnetic field and the heat of the magnetic particles causes the phase transition to the fluid medium. In some embodiments, the plurality of magnetic particles may be heated by the alternating magnet field inducing a current within a set of the plurality of magnetic particles. In some embodiments, the current may be an eddy current. In some embodiments, the plurality of magnetic particles may be heated by the alternating magnetic field causing one or more of hysteresis losses, Brownian relaxation, or Néel relaxation. In some embodiments, the phase transition may include generating steam in the interior area by the heated magnetic particles boiling the fluid medium in the interior area, such that the steam causes the bladder to expand within the sleeve. In some embodiments, the bladder may be expanded due to pressure caused by the steam within the interior area, and due to confinement of the bladder within the sleeve, the expansion or retraction of the bladder generates the actuation.

In some embodiments, the bladder may be made of latex material. In some embodiments, the plurality of magnetic particles may be microparticles or nanoparticles. In some embodiments, each nanoparticle may be between 200 nm and 300 nm in diameter. In some embodiments, the plurality of magnetic particles may comprise one or more of: iron, iron oxide, nickel, nickel oxide, cobalt and/or cobalt oxide. In some embodiments, the plurality of magnetic particles may comprise $Fe_3O_4$. In some embodiments, the sleeve may be made of braided carbon fiber. In some embodiments, the fluid medium may be a low boiling point liquid. In some embodiments, the fluid medium may be deionized (DI) water, carbonated water, or ethanol. In some embodiments, the alternating magnetic field may be a high frequency alternating magnetic field. In some embodiments, the plurality of magnetic particles may be coated with a coating material to prevent agglomeration. In some embodiments, the coating material includes one or more polymers, such as methoxy-PEG-silane.

BRIEF DESCRIPTION OF THE DRAWINGS

The foregoing features of embodiments will be more readily understood by reference to the following detailed description, taken with reference to the accompanying drawings, in which:

FIGS. 1A-1D is a block diagram of prior art McKibben artificial muscles.

FIGS. 1G-1J are diagrams showing a robot arm actuated by prior art pneumatic artificial muscles.

FIGS. 2A-2B are block diagrams of a wireless actuation system functioning based on induction heating of magnetic particles in an alternating magnetic field, according to embodiments of the present invention.

FIGS. 4C and 4D are images showing temperature measurement of an actuation cycle of an actuator according to embodiments of the present invention.

FIGS. 4E and 4F are images illustrating the pressure generated inside the bladder of an actuator according to embodiments of the present invention.

DETAILED DESCRIPTION OF SPECIFIC EMBODIMENTS

Embodiments of the present invention described herein address the challenges mentioned above by using wireless signals to power up actuators including thermal and pneumatic actuators, and, indeed, any type of thermomechanical actuator. These embodiments generate the required pneumatic pressure inside a McKibben-type artificial muscle without using compressors, pumps, and valves. Embodiments are based on induction heating of magnetic micro/nano particles within a fluid environment by an alternating magnetic field. For example, an embodiment may generate high pressure steam via inductively heating magnetic nanoparticles mixed with a phase changing fluid, such as water, with a small and portable high-power induction heater. Metallic particles such as ferromagnetic nanoparticles (e.g., $Fe_3O_4$) generate heat when exposed to a high frequency alternating magnetic field. The physics behind this phenomenon can be produced by different mechanisms such as hysteresis losses, Joule heating via eddy current, Brownian, and Néel relaxation.

Wireless Actuation System

Reference is made to FIGS. 2A-2B, wherein a system 200, in accordance with an embodiment of the present invention, is depicted schematically. In embodiments, the magneto-thermal effect may be used by the system 200 to generate actuation by device 210 (e.g., an embodiment of a pneumatic artificial muscle or actuator).

Figure 1E:
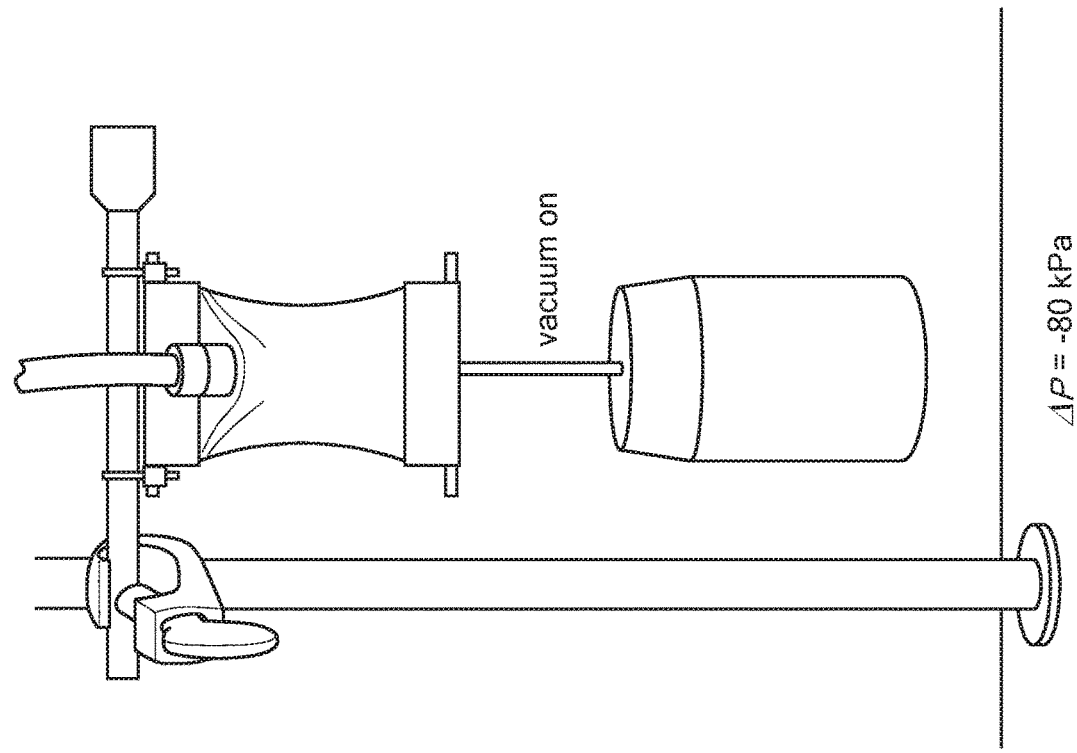
FIGS. 1E-1F are diagrams depicting operation of a prior art origami-inspired artificial muscles (actuators).
Figure 1F:
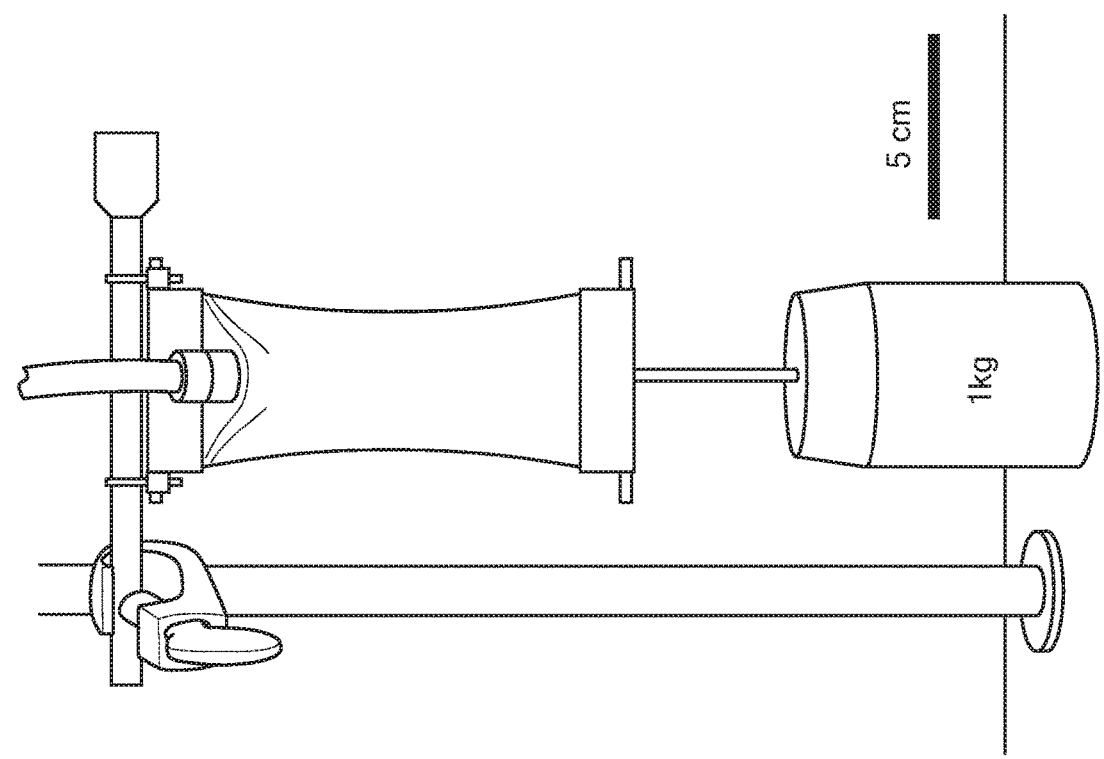
Figure 1L:
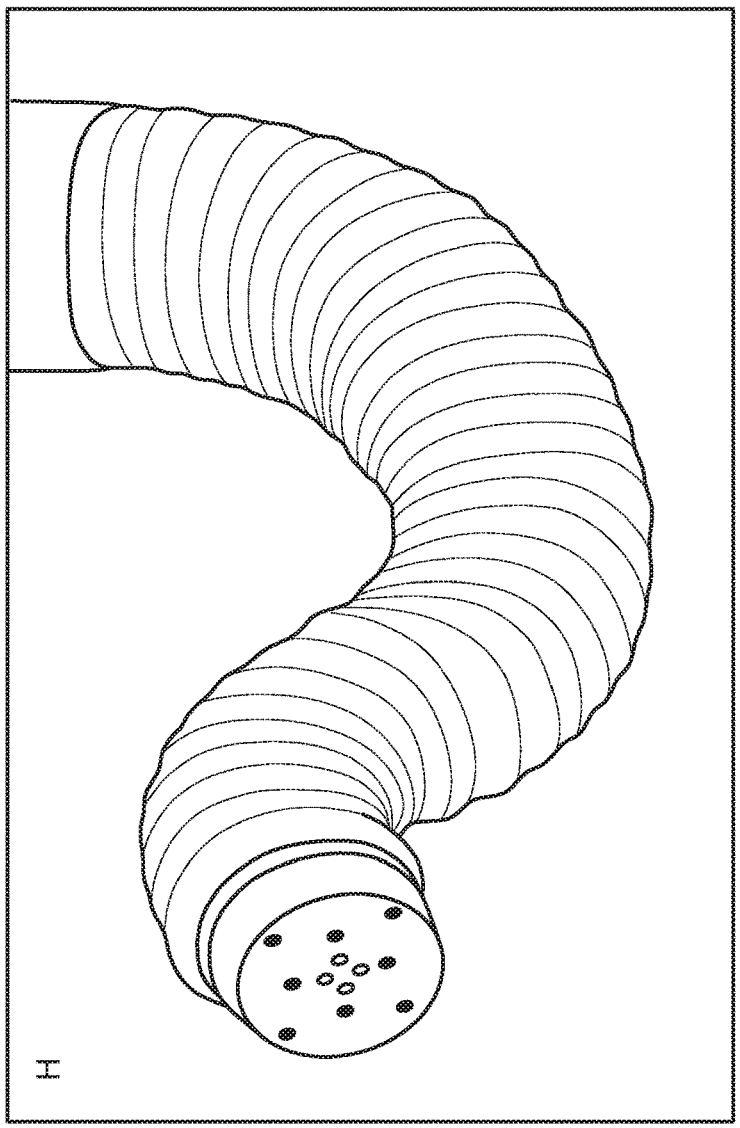
FIGS. 1K-1L are diagrams showing a prior art pneumatic artificial muscle functioning as a gripping mechanism.
Figure 1K:
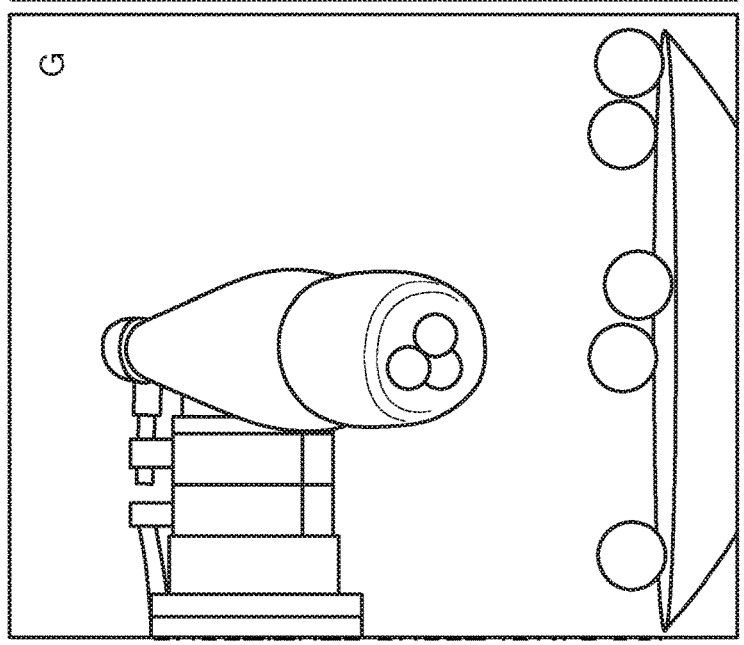
Figure 2C:
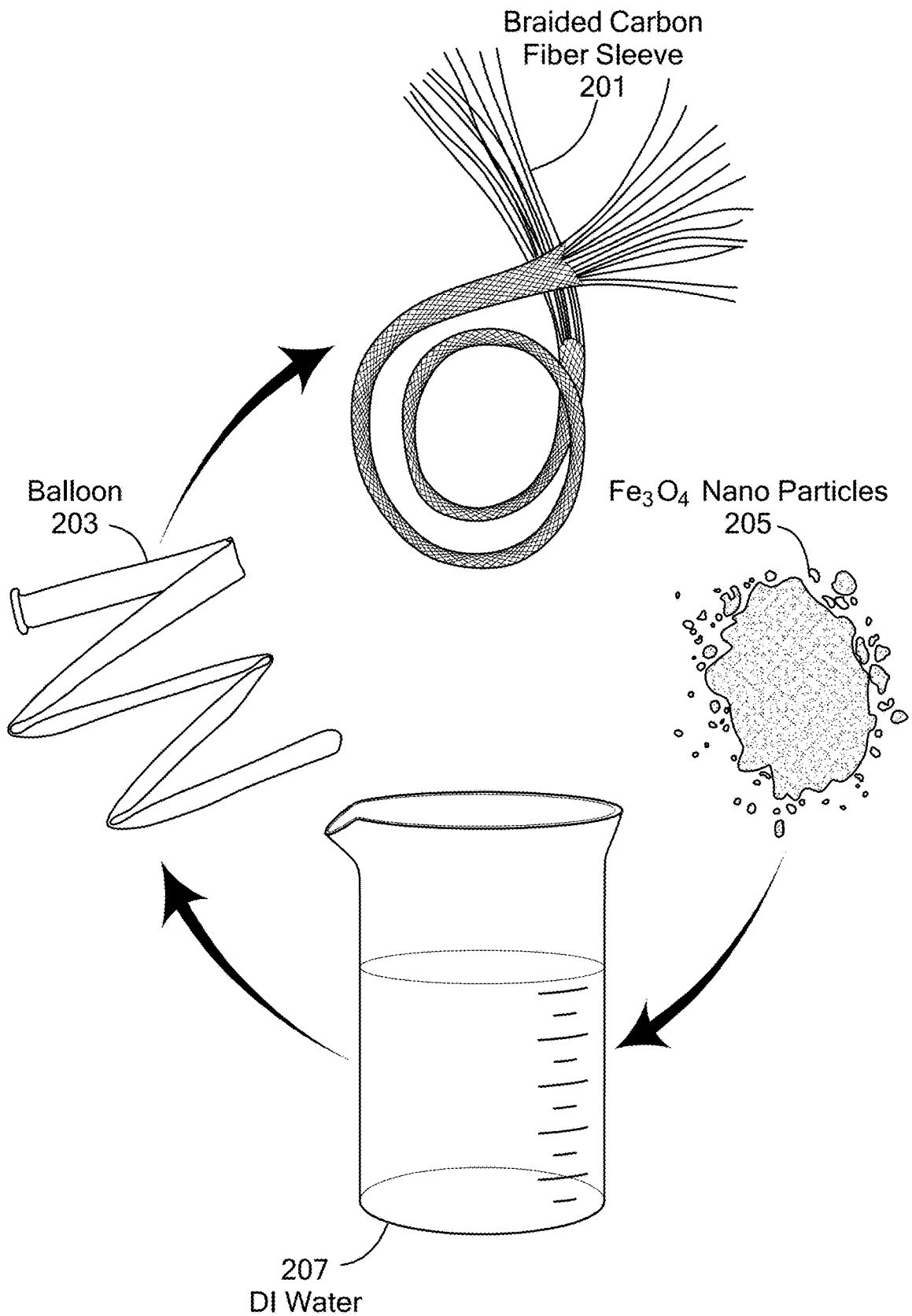
FIG. 2C is a block diagram of materials used in the actuation system, according to embodiments of the present invention.

As shown in FIG. 2A, the device 210 includes a bladder 203. The bladder 203 has an inner surface and an outer surface, the inner surface forming an interior area. The bladder 203 is configured to expand or retract so as to change an area of the interior area. To configure the device 210, the bladder 203 is filled with a dispersion of magnetic particles 205, preferably nanoparticles or microparticles, (e.g., iron, iron oxide, nickel, nickel oxide, cobalt oxide, etc.) suspended in a fluid medium 207, such as a low boiling point liquid (e.g., water, ethanol, etc.), and disposed within the interior area of the bladder 203. In some embodiments, the magnetic particles 205 are coated with a material, for example polymers, such as methoxy-PEG-silane, to prevent any potential agglomeration of the magnetic particles. In the example embodiment, as shown in FIG. 2C, the bladder 203 is a latex balloon, the magnetic particles 205 comprise a magnetite ($Fe_3O_4$), and the fluid medium 207 is deionized (DI) water. The bladder 203 is then sealed (e.g., knotted). The sealed bladder 203 is inserted into a braided sleeve 201 disposed on the outer surface of the bladder 203, by which the bladder 203 is confined. In the embodiment of FIG. 2C, the braided sleeve 201 is made of carbon fibers. In some embodiments, the braided sleeve 201 may be rolled up on the compliant/stretchable bladder 203. All degrees of softness and compliance of the braided sleeve 201 are included within the scope of the present invention. In other embodiments, the bladder 203, magnetic particles 205, fluid medium 207, and sleeve 201 may be composed of different materials that produce a similar operation.

As shown in FIG. 2B, upon excitation by an alternating, high frequency magnetic field of the system 200, the magnetic particles 205 react by rising in temperature (heating), which causes a phase transition to the fluid medium 207 within the interior area of the bladder. In the example embodiment of FIG. 2B, the heating of the magnetic particles 205 causes boiling of the fluid medium 207 to generated the phase transition of steam bubbles 209. The phase transition increases a pressure within the bladder 203. Due to the confinement of the bladder 203 within the braided sleeve 201, a volumetric expansion of the bladder 203, caused by the increased pressure, translates to an axial contractile strain and radial expansion of the bladder 203. Such contraction and expansion generate actuation energy or power by the device 210 that is used to move or control a mechanism or system. The bladder 203 retracts back to its original position when the alternating magnetic field is removed causing the magnetic particles 205 and fluid medium 207 to no longer be heated.

In embodiments, the excitation is due to direct or indirect heating of the magnetic particles 205 by the alternating magnetic field. In some embodiments, the magnetic heating is ohmic heating, such that the heating is caused by the magnetic field inducing an electric current (e.g., eddy current) within the device 210. In an embodiment, the heating is caused by the magnetic field generating an electric current within each of the magnetic particles 205 contained in the device 210. In other embodiments, the heating of the magnetic particles 205 is caused by the magnetic field through hysteresis losses, Brownian, and Néel relaxation, and such.

Method of Wireless Actuation

Figure 6:
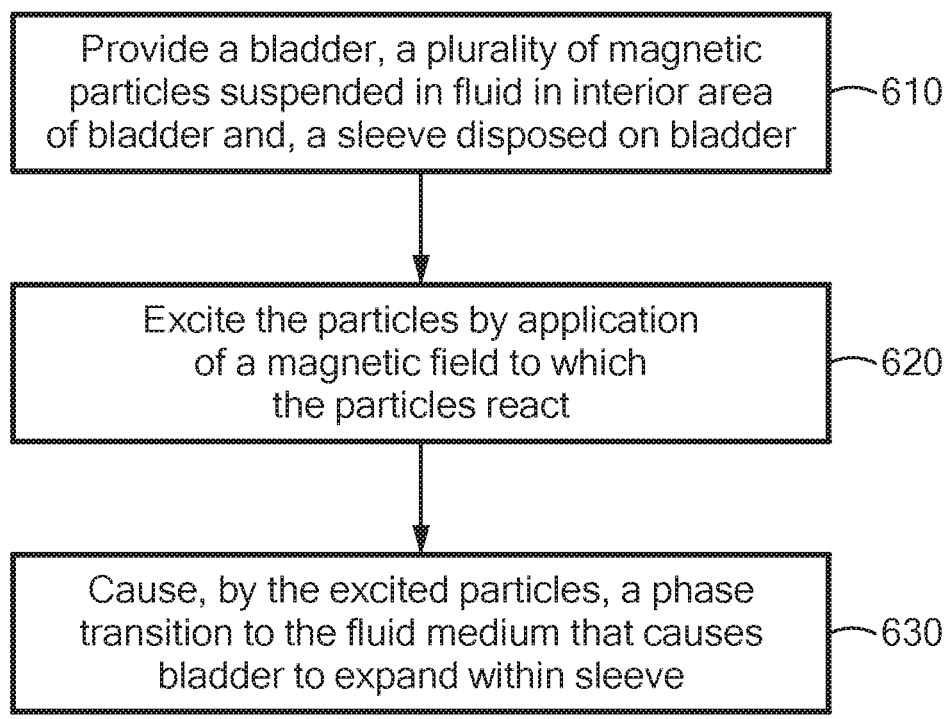
FIG. 6 is a flow chart of generating wireless actuation according to embodiments of the present invention.

FIG. 6 is a flow chart of generating wireless actuation according to embodiments of the present invention. At step 610, the method provides a bladder that has an inner surface and an outer surface, and the inner surface forms an interior area of the bladder. The bladder is configured to expand or retract so as to change an area of the interior area of the bladder. A plurality of magnetic particles are suspended in a fluid medium and disposed within the interior area of the bladder. In some embodiments, the magnetic particles are coated with a material, for example polymers, such as methoxy-PEG-silane, to prevent any potential agglomeration of the magnetic particles. A braided sleeve is disposed on the outer surface of the bladder. In some embodiments, the bladder is made of latex material (e.g., a latex balloon). In some embodiments, the magnetic particles are microparticles or nanoparticles. In an embodiment, the magnetic particles are nanoparticles between 200 nm and 300 nm in diameter. In some embodiments, the magnetic particles comprise one or more of: iron, iron oxide, nickel, nickel oxide, cobalt and/or cobalt oxide. In an embodiment, the magnetic particles comprise $Fe_3O_4$. In some embodiments, the fluid is a low boiling point liquid, such as DI water, carbonated water, ethanol, etc. In some embodiments, the sleeve is made of braided carbon fiber.

At step 620, the method excites the magnetic particles by application of an alternating magnetic field to which the magnetic particles react. In some embodiments, the magnetic field is a high frequency alternating magnetic field. In some embodiments, the excitement of the magnetic particles includes heating of the particles within the interior area of the bladder in reaction to the alternating magnetic field. In some embodiments, the magnetic particles are excited by the alternating magnetic field inducing a current (e.g., an eddy current) within a set of the magnetic particles. In some embodiments, the magnetic particles are excited by the magnetic field causing hysteresis losses, Brownian relaxation, and/or Néel relaxation.

At step 630, the method causes, by the excited magnetic particles, a phase transition to the fluid within the interior area of the bladder which causes the bladder to expand, such that the sleeve confining the bladder generates actuation from the expansion or retraction of the bladder. In some embodiments, where the excitement includes heating, the heated particles cause the phase transition to the fluid within the interior area of the bladder. In some of these embodiments, the phase transition includes generating steam within the interior area of the bladder by the heated magnetic particles boiling the fluid within the interior area, such that the steam causes the bladder to expand within the sleeve. In some of these embodiments, the bladder is expanded due to pressure caused by the steam, and due to confinement of the bladder within the braided sleeve, the expansion or retraction of the bladder causes actuation. The expansion may include axial contractile strain, radial expansion, rotation, etc. of the bladder that generates the actuation. The actuation produces power or energy that may be used to move or control a mechanism or system, such as a robot arm.

Embodiments of the device 210 may be used in thermal actuators such as nylon actuator, shape memory alloys, shape memory polymers, and shape memory materials in general. The magnetic particles 205 may be dispersed in a liquid adhesive and coated on the actuator body to generate the heat required for excitation. For paraffin wax-infiltrated actuators, the magnetic particles 205 may be mixed with paraffin or any other thermo-responsive material with good volumetric expansion and infiltrate the yarn with it. Bending, linear, and torsional actuators made with nylon and shape memory alloys may be used.

Applications

Pneumatic artificial muscles have been applied in biomedical devices such as prosthetic arms/legs, robotic arms, robotic grippers, and even 3D printers. Classic pneumatic linear actuators made from movable discrete components such as pistons moving within cylinders, can generate relatively high strain rates and are typically used in industries requiring rapid manufacturing throughput. Due to the untethered nature of the actuation mechanism, the actuator can potentially be used in a confined environment in which a mechanical work is required. Examples can be in vacuum or cryogenic environments.

Another confined environment can be the human body. In balloon angioplasty, an endovascular procedure to widen narrowed or obstructed arteries or veins (typically to treat arterial atherosclerosis), a balloon is pressurized from outside the body. By utilizing techniques in accordance with the present invention, there is no need to have a long tube. Moreover, instead of one balloon at a time, multiple balloons can be used at different locations without the need for a tube.

One of the major advantages of techniques described herein in accordance with embodiments of the present invention is that unlike electromagnetic waves, the magnetic field may be localized and can be used to locally active actuators without activating the neighbouring ones. Some approaches are offered by harvesting EM waves and using them to charge a capacitor and use the charge in the capacitor to power up a micro-device. The problem associated with this technique is that the device can be hacked by and EM waves can scatter in different environments in different directions.

Fabrication methods, such as molding and 3D printing, have been used to fabricate PAMs that can generate bending and/or torsional actuation in addition to linear actuation. The techniques in embodiments of the present invention use heat converting units, such as magnetic nano/micro particles combined with phase transition materials, to achieve pressure inside a confined system. This pressure can be utilized in any actuator (that works on the basis of pressure or phase transition of a material) fabricated via additive manufacturing (e.g., 3D printing), molding, and other such manufacturing techniques.

Example I

Figure 3A:
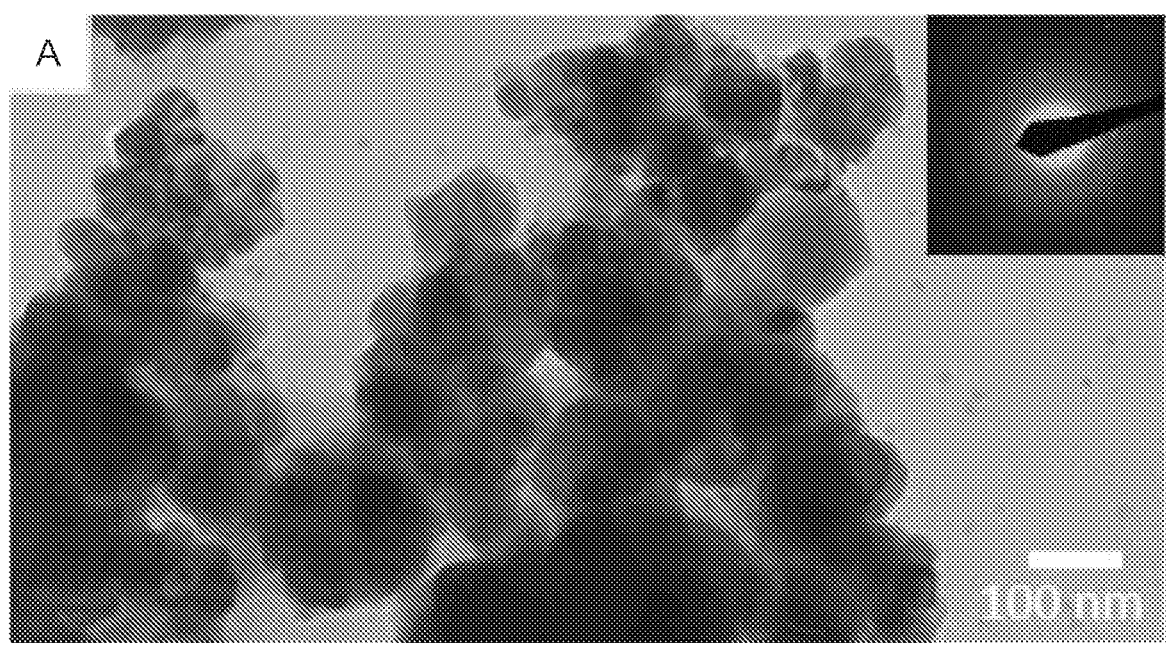
FIG. 3A is a scanning electronic microscope (SEM) image of magnetic particles used to generate actuation according to embodiments of the present invention.
Figure 3B:
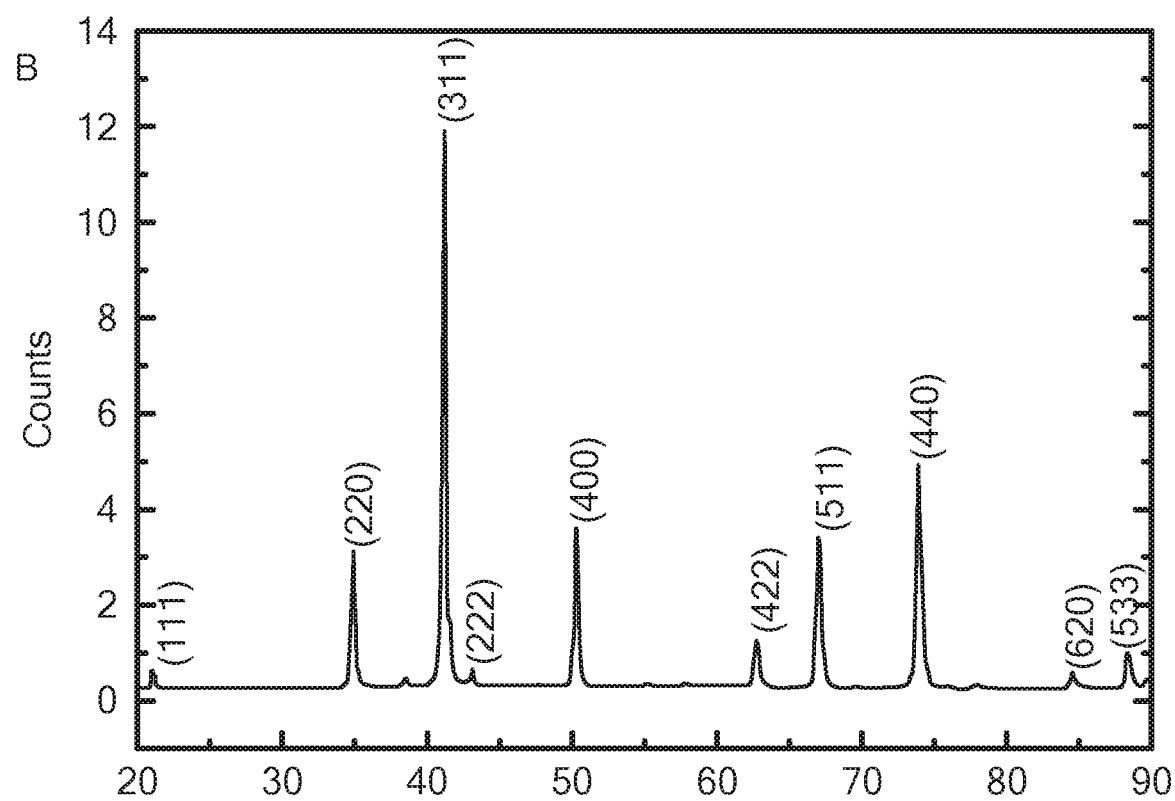
FIG. 3B is a graph of the X-ray powder diffraction (XRD) patterns of a magnetic particles sample used to generate actuation according to embodiments of the present invention.
Figure 3C:
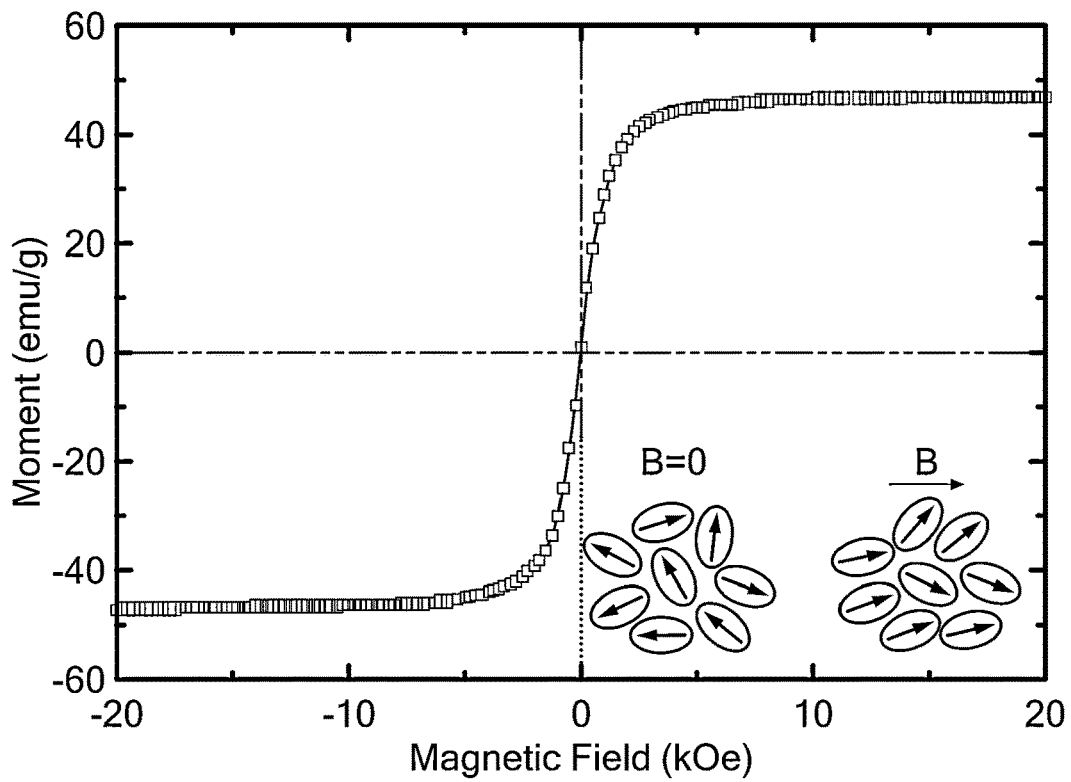
FIG. 3C is a graph of moments of power as a function of a magnetic field applied to a magnetic particles sample used to generate actuation according to embodiments of the present invention.
Figure 3D:
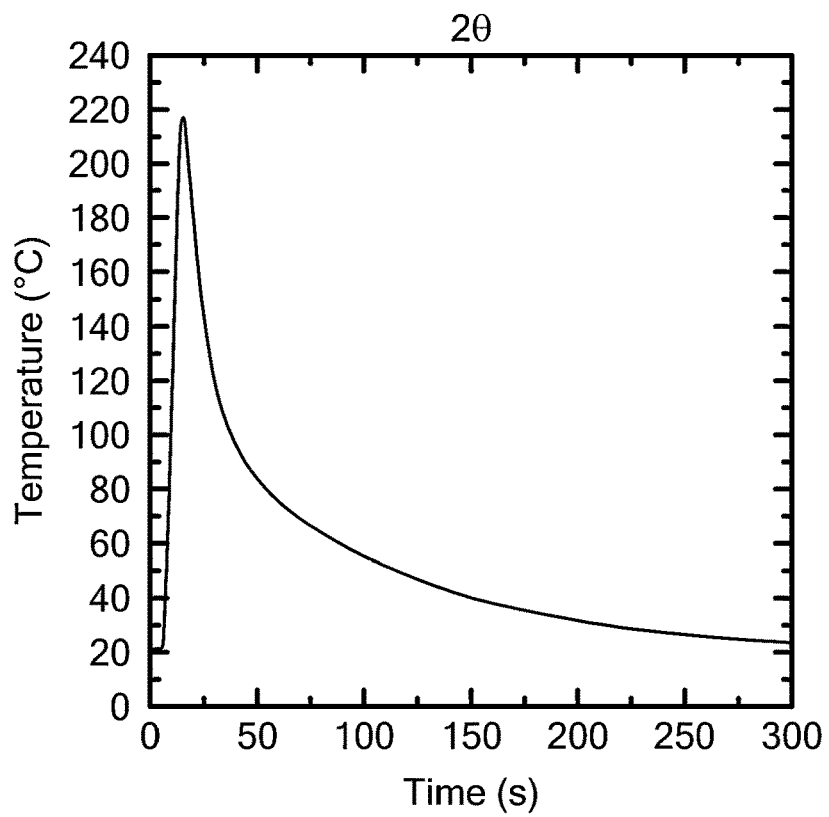
FIG. 3D is a graph of the temperature increase rate of a magnetic particles sample excited with a magnetic field according to embodiments of the present invention.

A wireless actuation device, such as shown in FIGS. 2A and 2B, was made from commercially available iron oxide-based magnetic nanoparticles. The magnetic nanoparticles had a particle size diameter that ranged between 200 nanometer (nm)-300 nm, as shown by the scanning electronic microscope (SEM) image in FIG. 3A. The magnetic nanoparticles were made of magnetite ($Fe_3O_4$), as shown by the graph of X-ray powder diffraction (XRD) patterns of the sample in FIG. 3B. The magnetic nanoparticles provide the energy converting units. Therefore, the more efficient the magnetic nanoparticles convert the alternating magnetic field to heat, the less input electric power is needed which enhances the over efficiency of the wireless actuation device. Magnetization plays an important role in determining the heat generation rate. At a DC magnetization magnetic moment of 47 emu/g, a temperature increasing rate of 20° C./s was measured for a 197 mg sample with the wireless actuation device excited with a magnetic field generated by an input power of 900 W at 224 kHz. FIG. 3C shows a graph of the DC magnetization moment of input power as a function of the magnetic field. FIG. 3D shows a graph of the increasing rate of the temperature (temperature as a function of time). This relatively large temperature increasing rate enabled achievement of higher strain rates. In fact, the strain rate was measured at 1.2%/s, which is higher than that of any phase changing-based materials McKibben muscle (<<1%/s).

Due to the high surface to volume ratio of the magnetic nanoparticles used, a higher rate of generating steam was achieved compared to the case of using a wire coiled inside the system to generate steam. This increase in steam generation was due to the fact that heating of the magnetic nanoparticles—water dispersion occurs almost simultaneously, whereas for the case of using a coiled wire, part of the heat should be transferred via convection or conduction in the phase-changing material. More importantly, using a solid wire as a heating element added to the stiffness of the actuator which in return decreased the contractile strain. Moreover, encapsulation of the system for high pressure conditions was much easier without implementing a heating wire that passes through the structure.

Figure 4A:
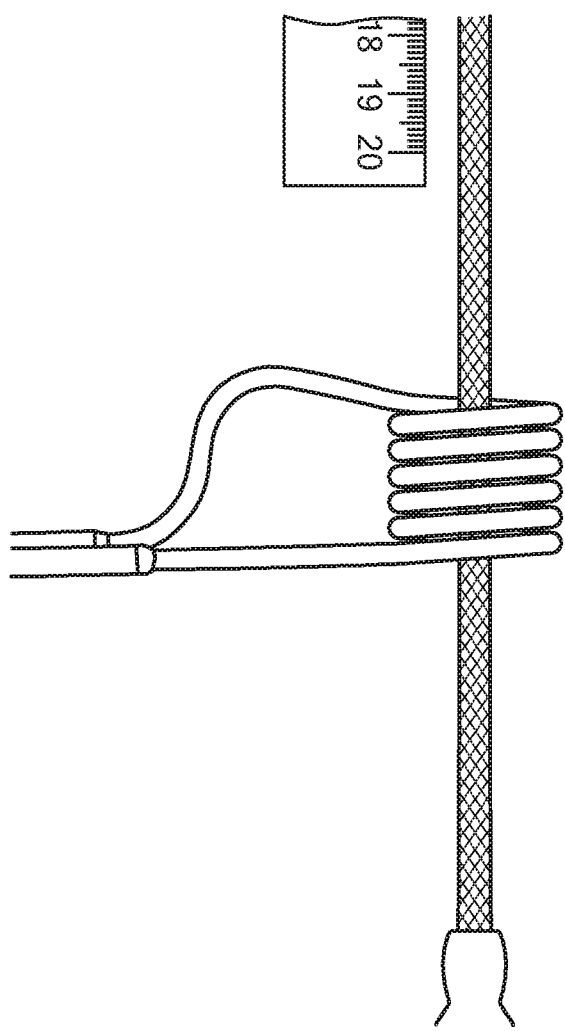
FIGS. 4A and 4B are images showing movement of a load before and after excitation of an actuator according to embodiments of the present invention.
Figure 4B:
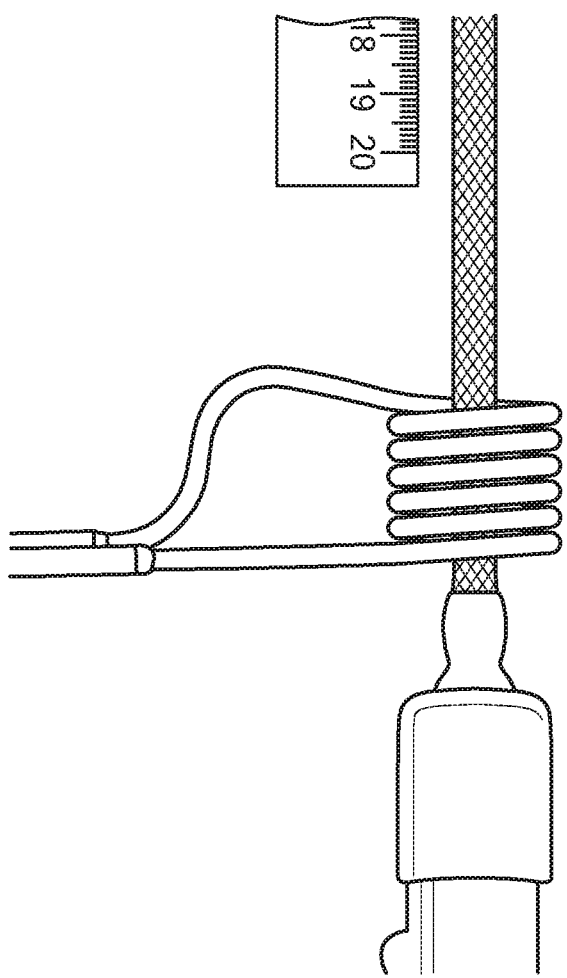
Figure 4G:
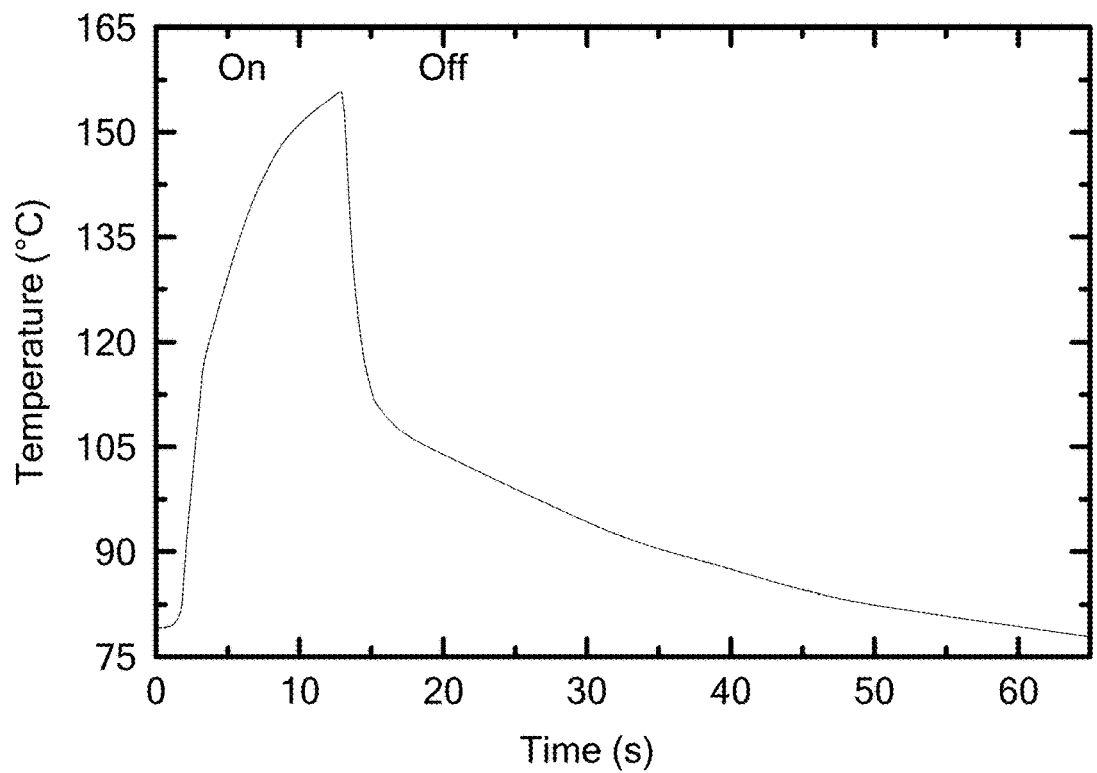
FIG. 4G is a graph illustrating the temperature profile of a magnetic particles sample during on-off excitation cycles according to embodiments of the present invention.
Figure 4H:
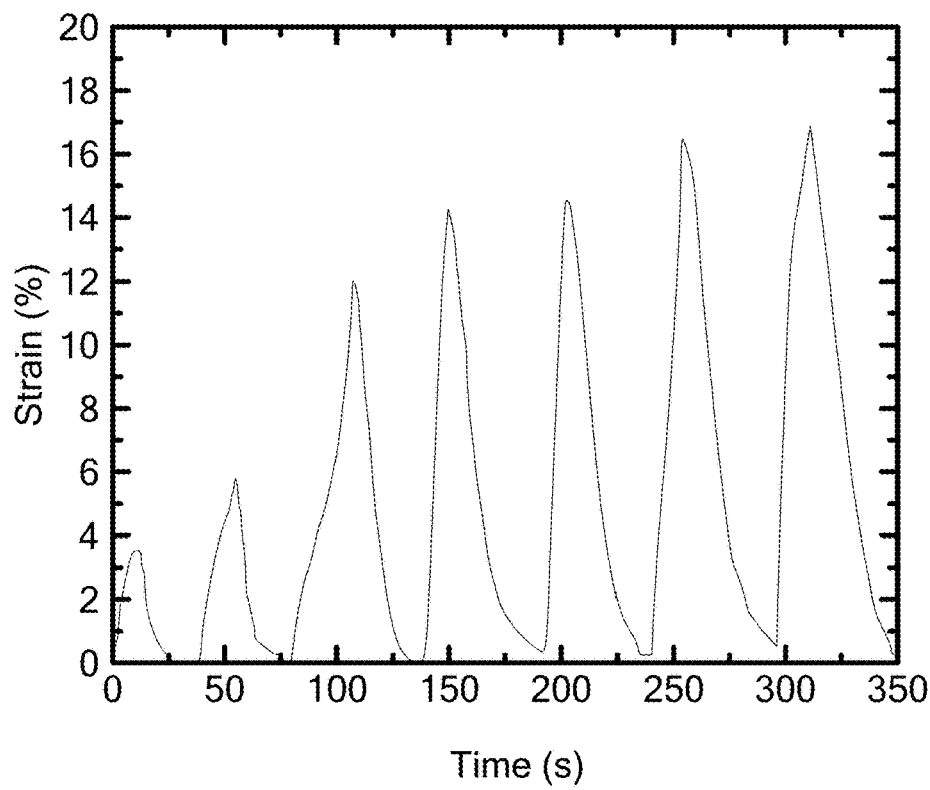
FIG. 4H is a graph illustrating strain curves of the actuator during multiple excitation cycles according to embodiments of the present invention.
Figure 4I:
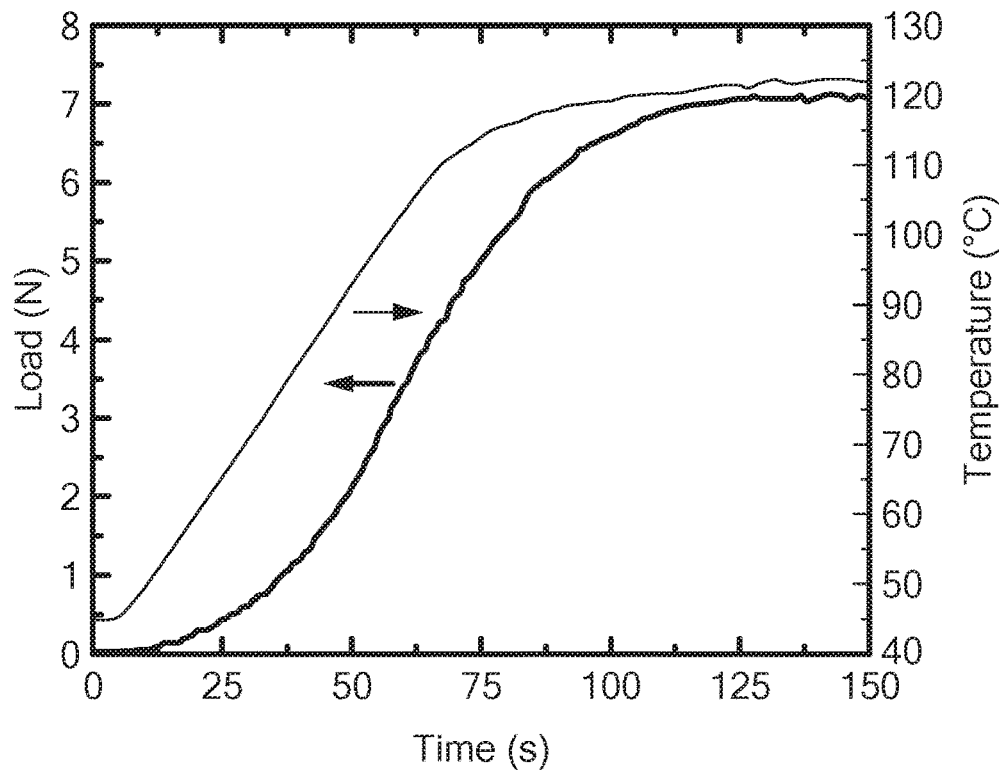
FIG. 4I is a graph illustrating temperature and block force profiles for a sample under isometric conditions according to embodiments of the present invention.

The wireless activation device made according to this example achieved 20% contractile strain under 2 kg of load, which is very comparable to what can be achieved with a high-pressure air McKibben artificial muscle. FIGS. 4A and 4B illustrate the wireless activation device under a load of 2 k before excitation (FIG. 4A), and the device under the 2 k load after excitation (FIG. 4B). Temperature measurements with a thermal camera and a fiber optic temperature measurement module revealed that the temperature inside the bladder exceeded 120° C. (as shown in FIGS. 4C-4D and 4I). FIGS. 4C and 4D illustrate temperature measurement of a sample actuation cycle of the device before excitation (FIG. 4C) by using a thermal camera and after excitation (FIG. 4D) using the thermal camera. FIG. 4I shows the temperature and block profiles for a sample under isometric conditions.

To demonstrate the generation of steam pressure inside the bladder, a glass vial was filled with magnetic nanoparticles/water dispersion and sealed within the latex balloon. When excited by a magnetic field, the dispersion generated enough pressure to expand the balloon. FIGS. 4E and 4F illustrate the excitation of the balloon filled with the magnetic nanoparticles/water dispersion illustrating the pressure generated inside the balloon (bladder) during the excitation. These figures show the balloon before excitation (FIG. 4E) and after excitation (FIG. 4F). A pressure measured at 2.1 kPa±0.44 kPa was required to inflate the same type of balloon to a similar volume that was inflated with the magneto-thermal excitation. The cooling time of the device in the relaxation state was on the order of 10s of seconds, as shown by the graph of FIG. 4G which plots the temperature profile of the sample during on-off cycles. The cooling time can be a rate limiting factor, however, it was observed to allow achievement of a higher strain rates in successive excitations. FIG. 4H shows a graph of a strain curve for multiple cycles of excitation of the device. The first cycles show the device still warming up, while the last cycles show the device having reached a steady state peak strain. As FIG. 4G suggests, the cooling (temperature) profile of the magnetic nanoparticles sample consisted of two cooling regions in the "off" state. In the first region, happening right after the power was switched off to the device (actuator), the drop in strain was large and fast. This fast drop in temperature and strain allowed the device to relax to its natural state faster while its temperature was still above the room temperature. This temperature gap can be harnessed in the next excitation cycle to save some heating time. To better evaluate the performance of the device (muscle), the block force (Fblock) was measured under isometric conditions. The measurement showed that the block force profile is very similar to that of the temperature profile which makes controlling the output force easier for robotic applications. FIG. 4I illustrates graphs of the temperature and block force profiles for a sample under isometric conditions.

Figure 5A:
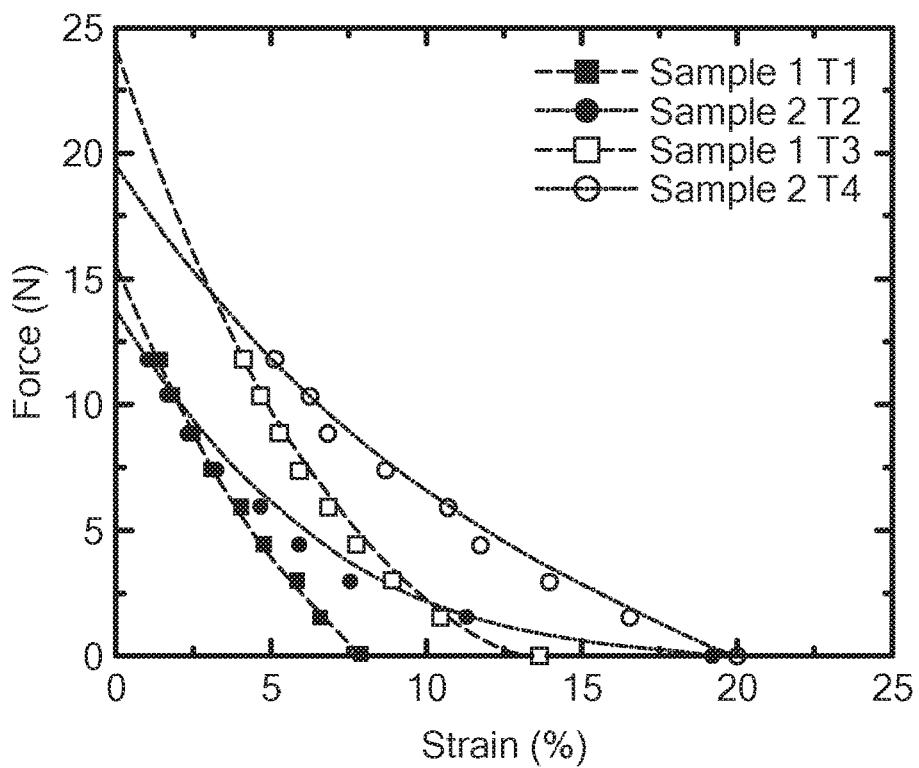
FIG. 5A is a graph illustrating the force and strain of two magnetic particle samples at two different temperatures according to embodiments of the present invention.

To better understand the working mechanism of the device, a model was developed which used temperature (T) and strain ($\epsilon$) to predict the output force from the following equation (A):

$$F(T, \epsilon) = (\pi r_o^2)\left[\gamma(T - T_o) - \frac{1}{\kappa}\ln\left(b(1-\epsilon) - \frac{a}{3}(1-\epsilon)^3\right)\right]\left[a(1-\epsilon)^2 - b\right] \quad (A)$$

where ro is the initial radius of the muscle, a and b are function of the initial bias angle of the braiding ($\theta$o), and $\gamma$ and $\kappa$ are thermal pressure coefficient and coefficient of compressibility, respectively. To evaluate this model, two samples were made with different initial bias angles and dispersion concentrations. Sample 1, with initial bias angle of 34.8° and dispersion concentration of 0.2 g/mL generated less strain at zero load, while sample 2, with bias angle of 40° and dispersion concentration of 0.1 g/mL, generated larger strain at zero load and smaller force at zero strain. The model was fitted with experimental data by measuring the T, To, $\theta$o, $\gamma$, and $\kappa$ experimentally. FIG. 5A shows a graph of the force (pressure) within the device as a function of percentage strain of the device using this model and experimental data for the two samples excited at two different temperatures.

Figure 5B:
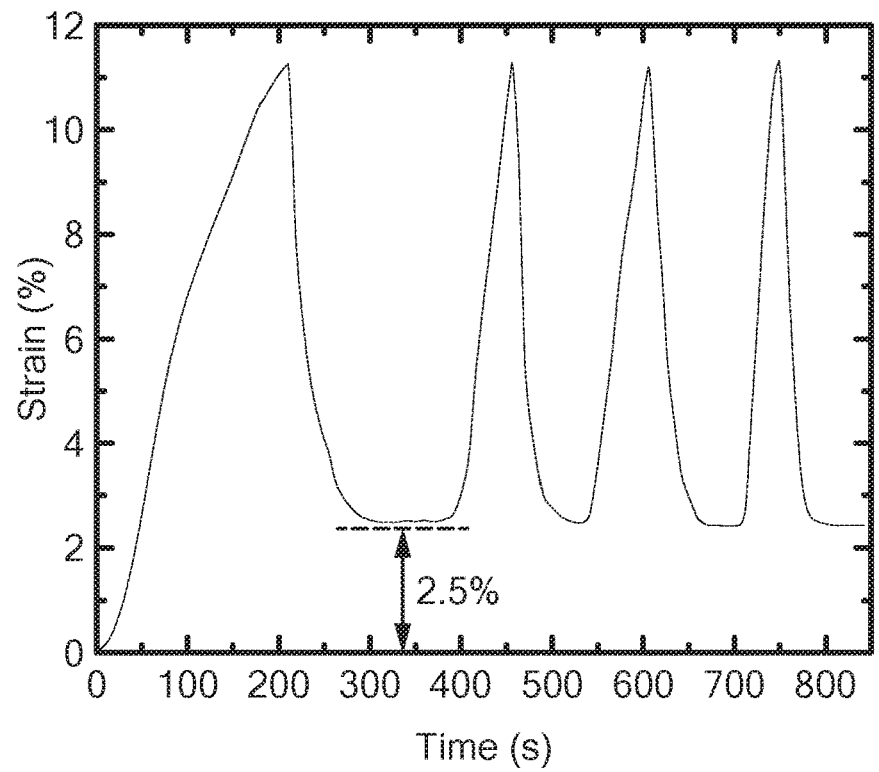
FIG. 5B is a graph illustrating the lock strain or lock contraction of an actuator according to embodiments of the present invention after a first excitation cycle using carbonated water as the fluid medium of the actuator.

For some robotic applications, such as in robotic surgery, it is desirable to lock the muscle after the first excitation without consuming further power. In nature, this happens to spider dragline silk. At high humidity conditions such as raining, the dragline silk super contracts (50% strain under no load) and maintains it. To obtain such a property, instead of using water, carbonated water was used to make the dispersion. The results show strain locking of 2.5% which is 22% of the active strain. FIG. 5B shows a graph that illustrates locking strain or locking contraction after the first cycle of the excitation with the dispersion made with carbonated water.

Figure 5C:
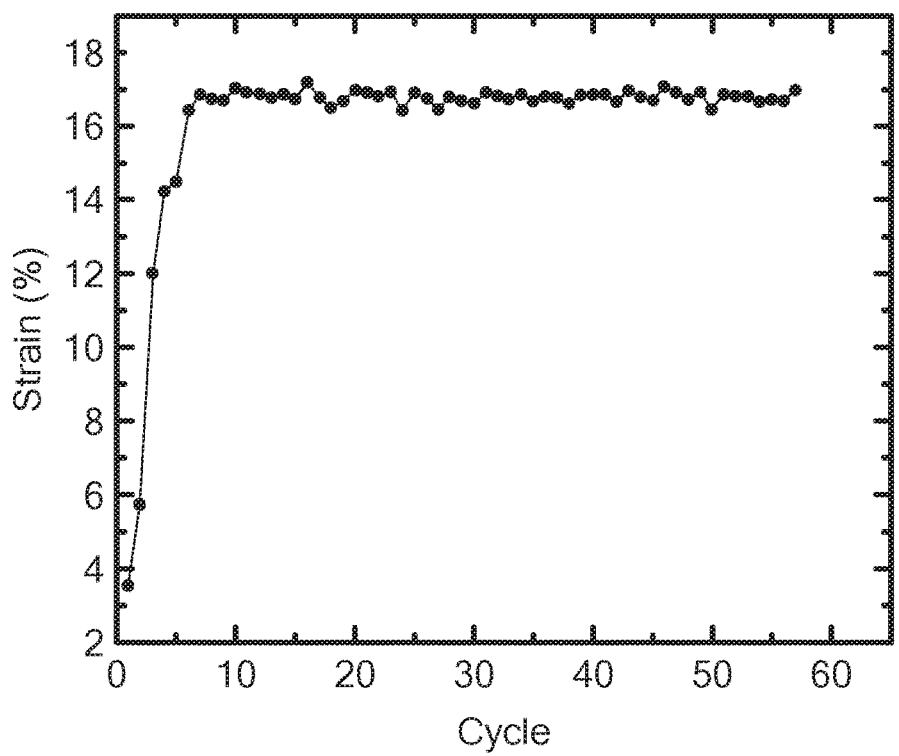
FIG. 5C is a graph illustrating the peak strain evolution of the actuator during successive excitation cycles according to embodiments of the present invention.
Figure 5E:
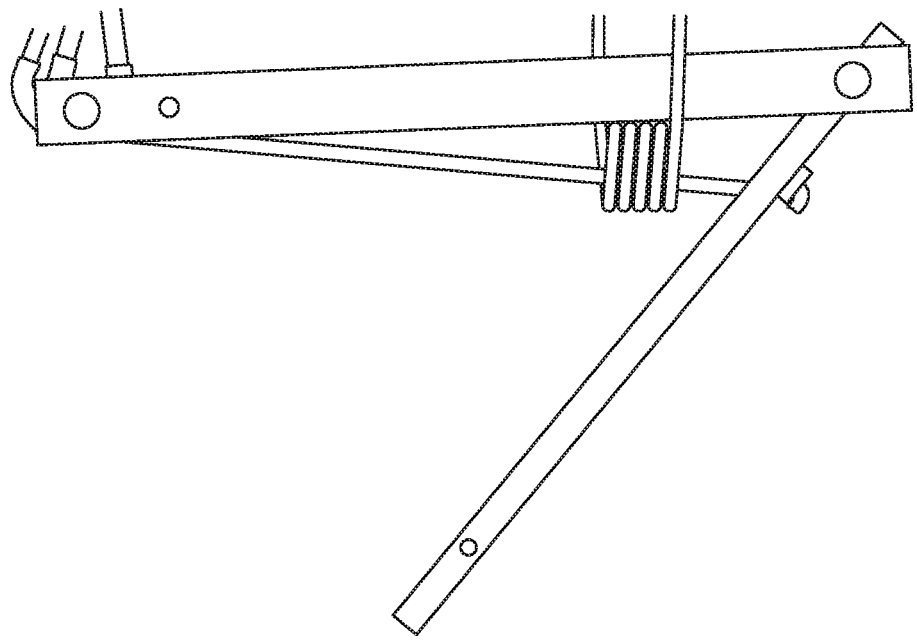
FIGS. 5D-5I are diagrams showing use of an actuator according to embodiments of the present invention as a robot arm under different loads.
Figure 5D:
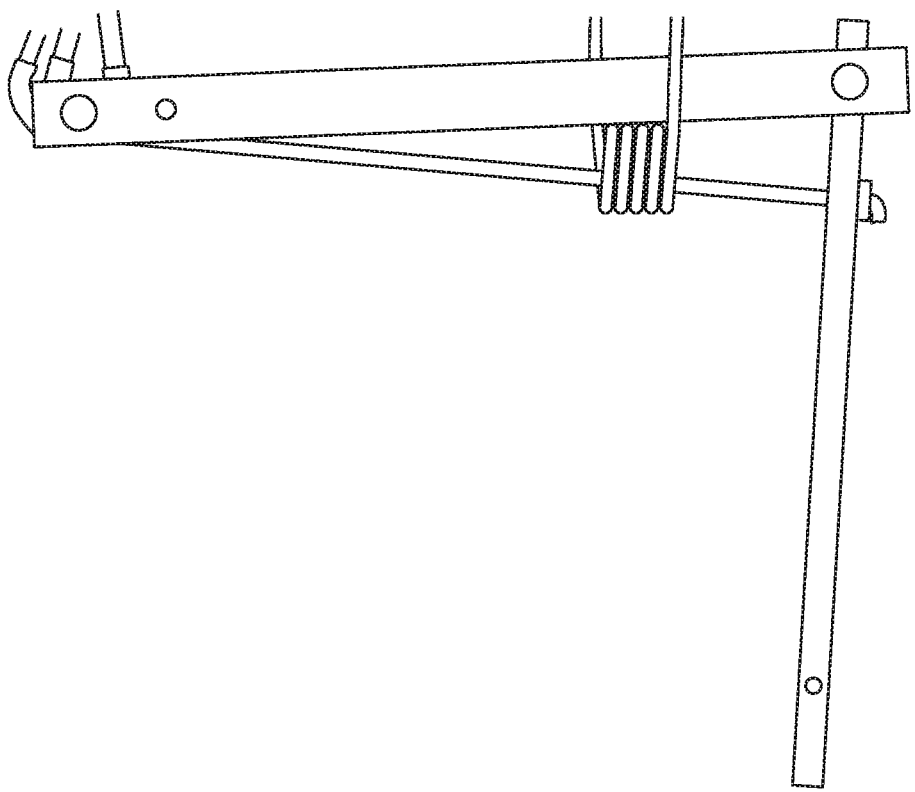
Figure 5G:
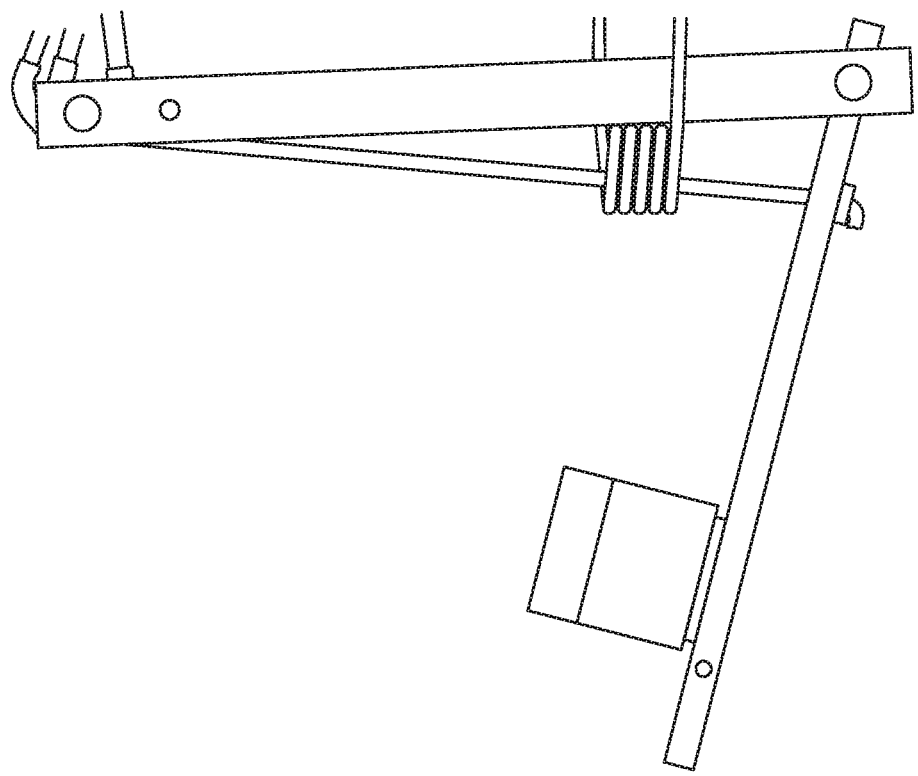
Figure 5F:
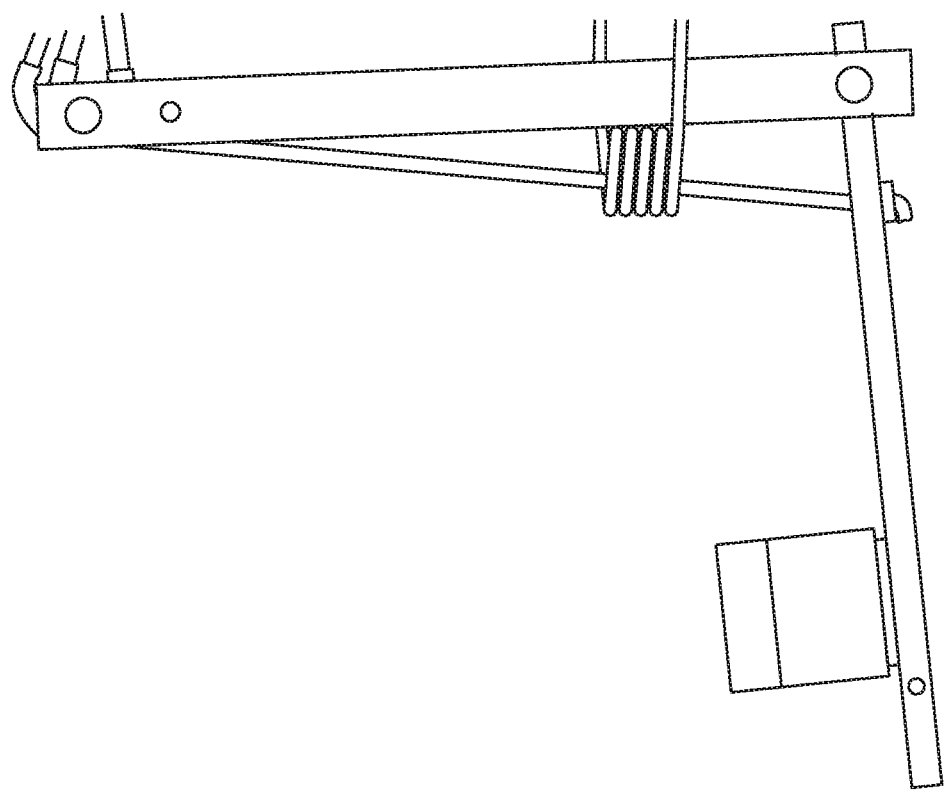
Figure 5I:
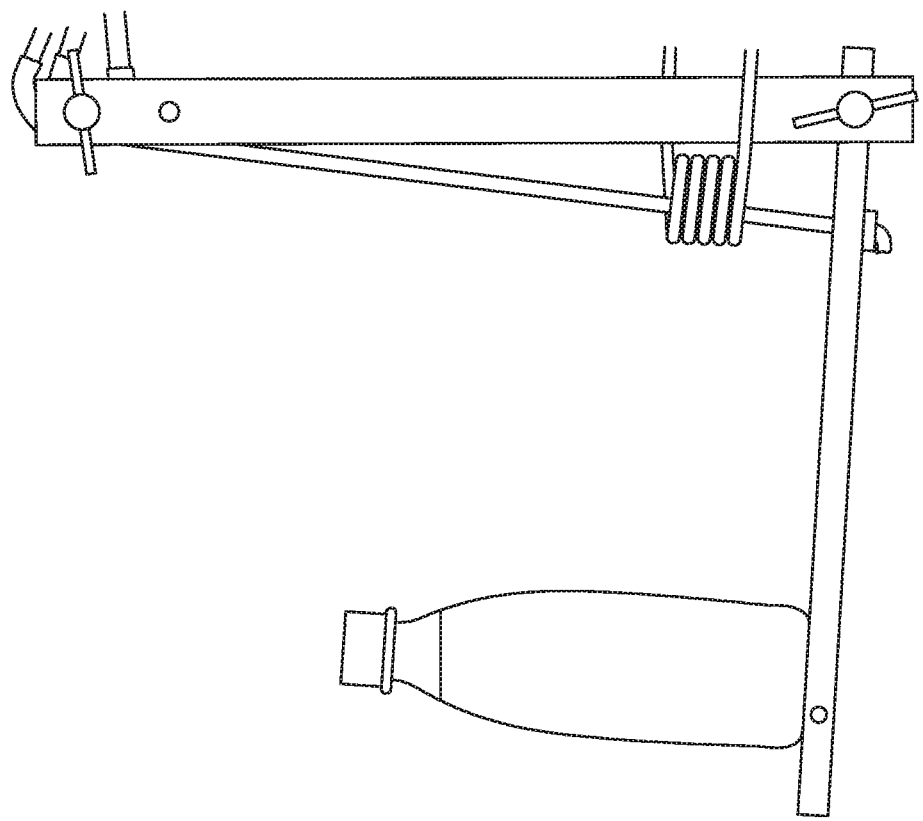
Figure 5H:
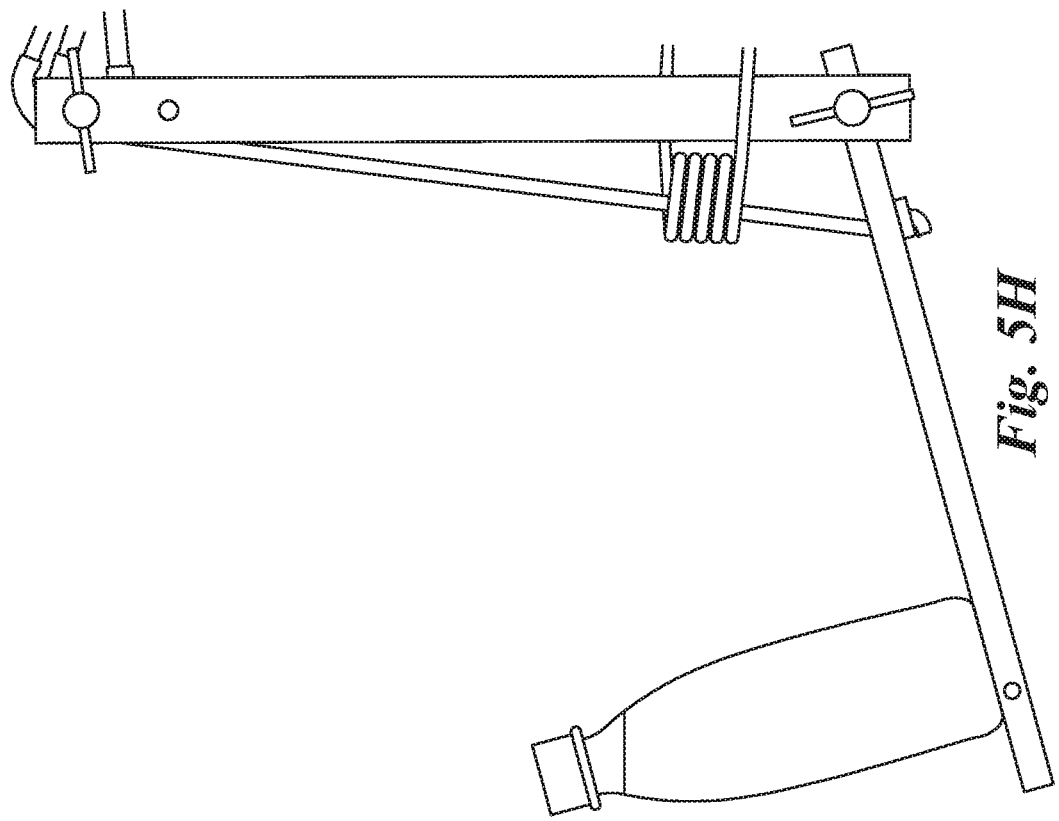

To evaluate reproducibility of the strain, the muscle was excited 50 more cycles after it reached a stable strain response and no significant degradation in the strain was observed. FIG. 5C shows a graph of the peak strain evolution through 50 successive excitation cycles. Considering the combination of strain and stress that the device can generate, it can be a good candidate for robotic applications. As a demonstration, a robotic arm was made and connected the device in a similar configuration to how the human biceps are connected to the elbow. Performance of the device was tested under no load, 250 g, and 500 g load. FIGS. 5D-5I demonstrates using the device for the robotic arm before (FIG. 5D) and after (FIG. 5E) excitation without any load, before (FIG. 5F) and after (FIG. 5G) excitation with the 250 g load, and before (FIG. 5H) and after (FIG. 5I) excitation with the 500 g load. The results indicate that the device can indeed be used for untethered robotic applications.

Example II

Material and Heating Mechanism

In this example, a concentration of 1-2 g iron oxide was dispersed in 7-10 mL of water and placed within a sealed bladder (muscle) and exposed to an alternating magnetic field.

Figure 8A:
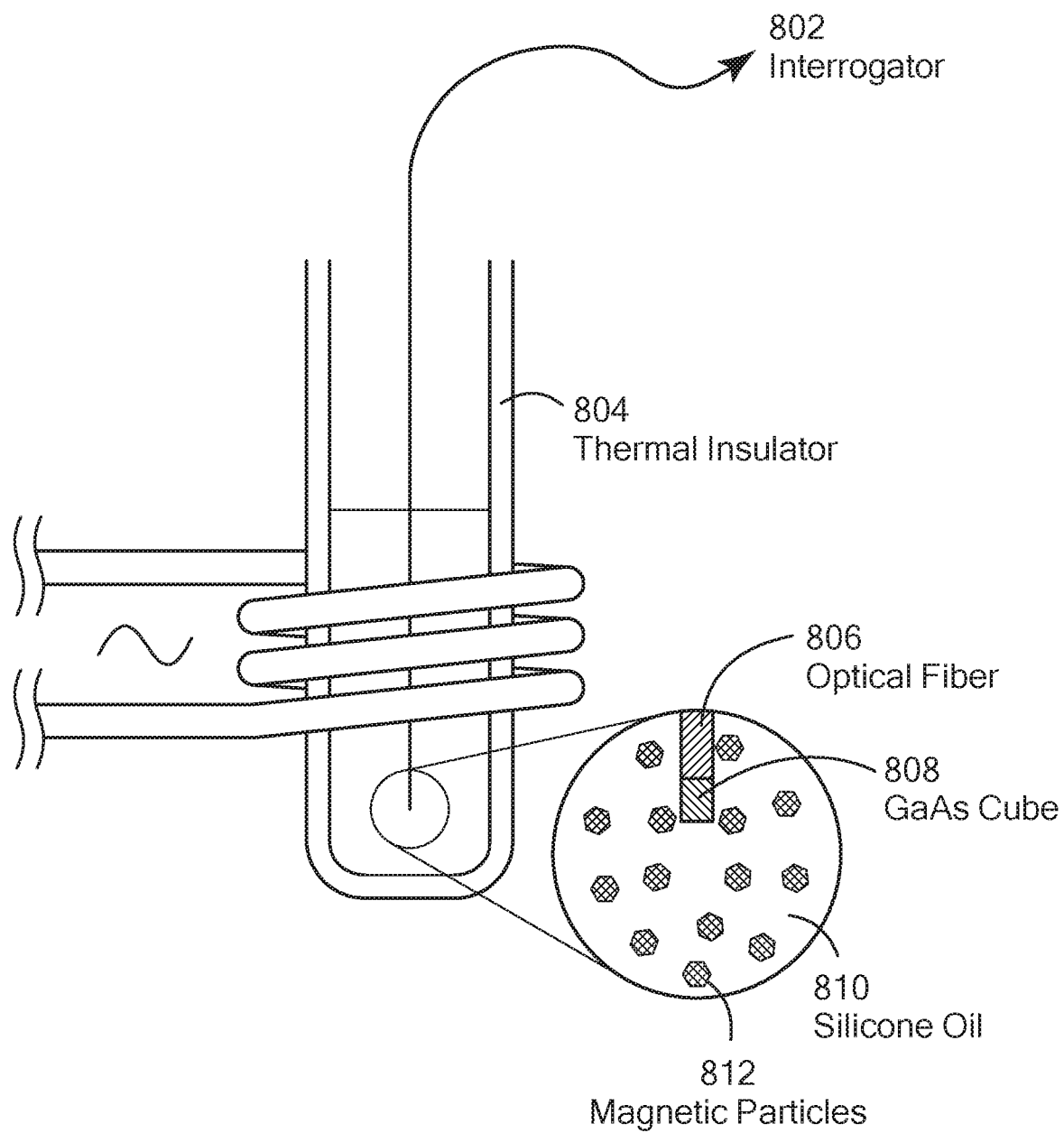
FIG. 8A is an apparatus used to examine heating power as a function of a magnetic field in an actuation mechanism according to embodiments of the present invention.
Figure 8B:
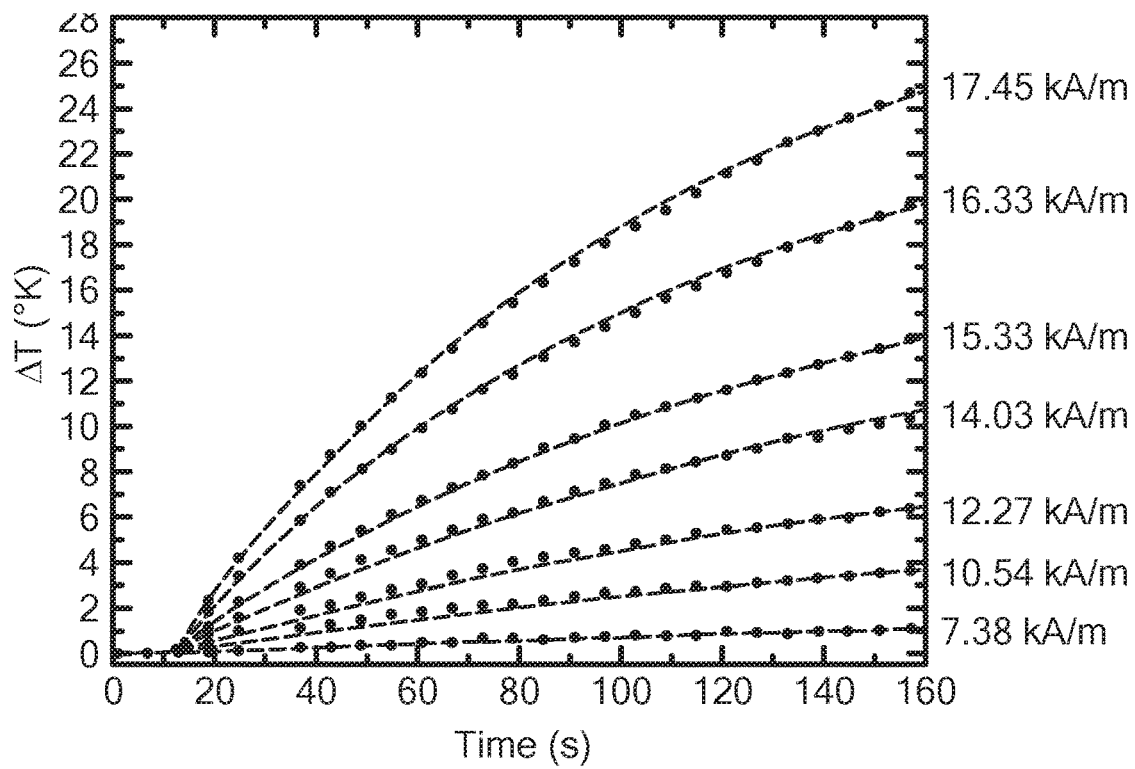
FIG. 8B is a graph of the temperature profile of the magnetic particles in the apparatus of FIG. 8A.
Figure 8C:
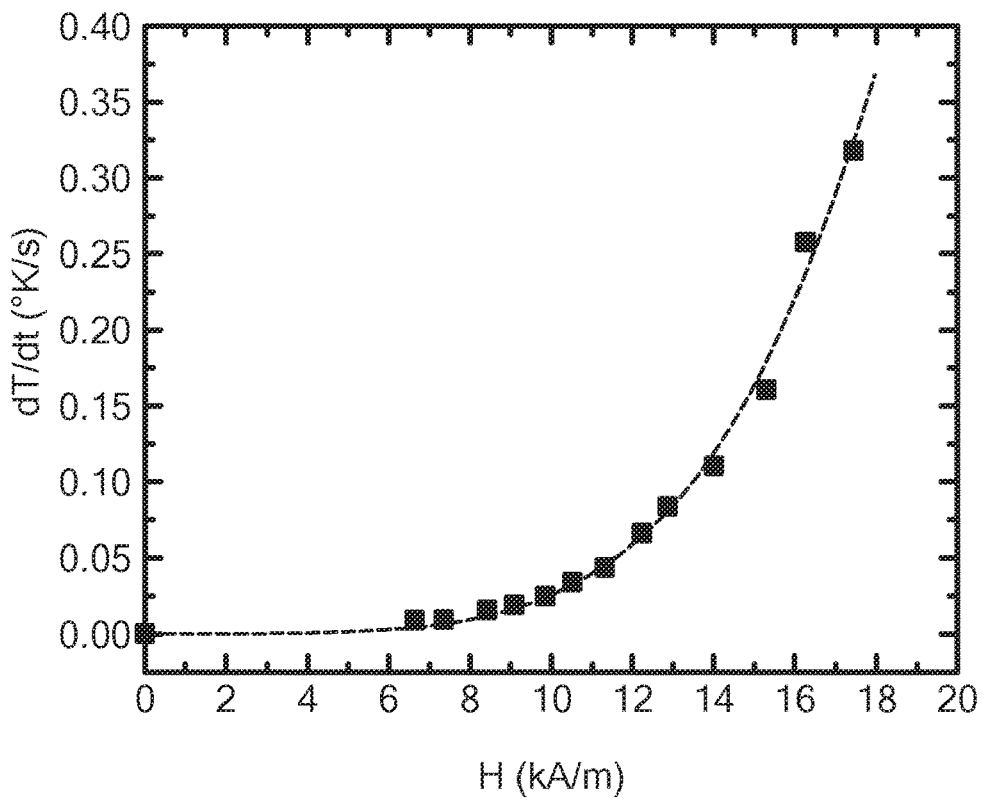
FIG. 8C is a graph of the initial rate of temperature increase as a function of magnetic field intensity in the apparatus of FIG. 8A.

Upon exposure to an alternating magnetic field, metals (with grain size of greater than 1 µm) generate heat due to formation of an eddy current. This induced current in the metallic piece generates a Joule heating effect. The distribution of the induced current inside the conductor is dictated by the skin depth which itself is a function of the frequency (f), electrical conductivity ($\sigma$) and magnetic permeability ($\mu$) of the material (i.e., $\delta = 1/\sqrt{\pi f \sigma \mu}$. The effective heating power (per mass) due to an eddy current for a polydispersion system with grain diameter mean square of $\langle d^2 \rangle$ equals:

$$\langle P_e \rangle = \frac{(\pi \mu_o f H)^2}{20 \rho_e \rho_m} \langle d^2 \rangle \quad (1)$$

where $p_e$ is the electrical resistivity of the metallic particles, $p_m$ is the volumetric mass density of the sample, f is the magnetic oscillation frequency, H is the magnetic field strength, $\mu_0$ is the vacuum magnetic permeability ($\mu_0 = 4\pi \times 10^{-7}$ H/m). The mean square of the grain diameter is $\langle d^2 \rangle = d_0^2 \exp(2\beta^2)$ where $d_0$ and $\beta$ are parameters of the lognormal function. In this form of induction of heating, the sample can be treated as an RL circuit where the L represents inductance of the secondary winding of a transformer with the primary winding being the induction heating coil and R represents the Joule heating effect (as shown in FIG. 8C).

Figure 7A:
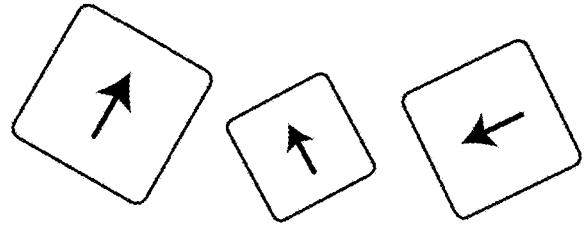
FIGS. 7A-F are block diagrams showing dominant heating mechanisms used in embodiments of the present invention.
Figure 7C:
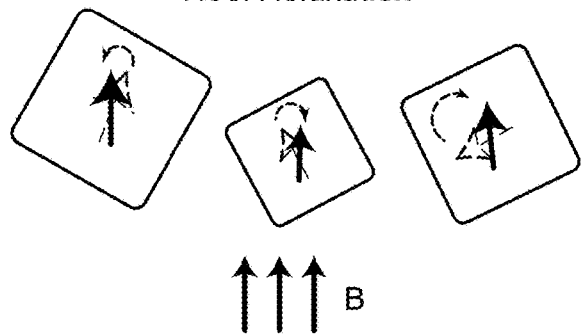
Figure 7B:
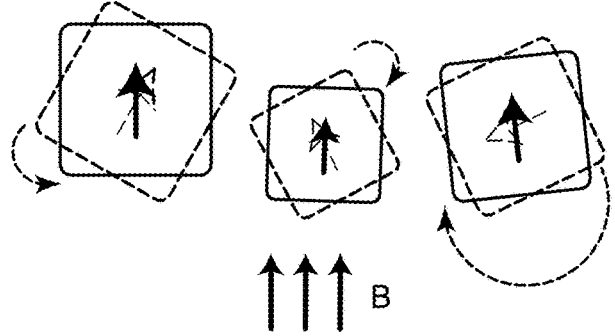
Figure 7D:
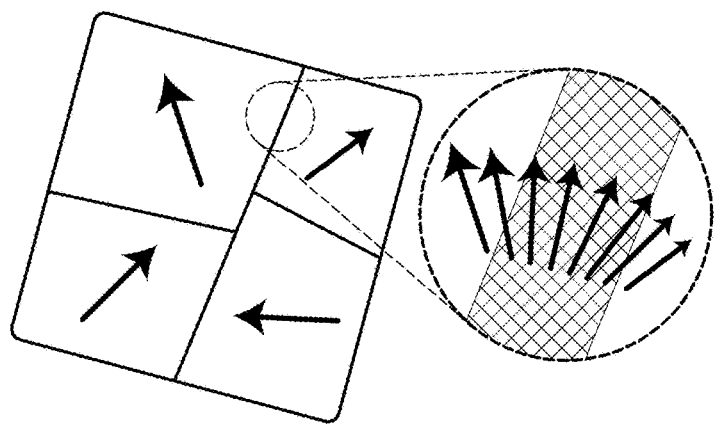
Figure 7E:
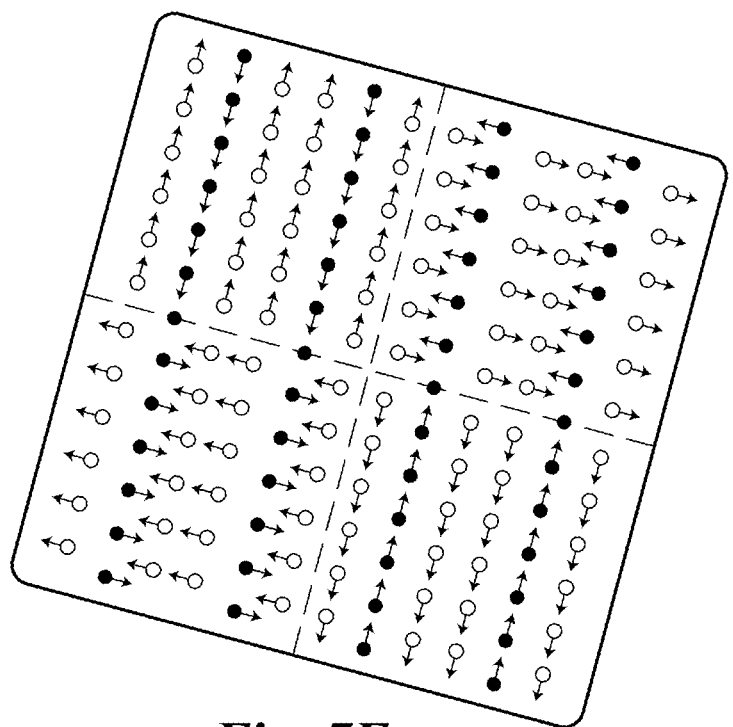
Figure 7F:
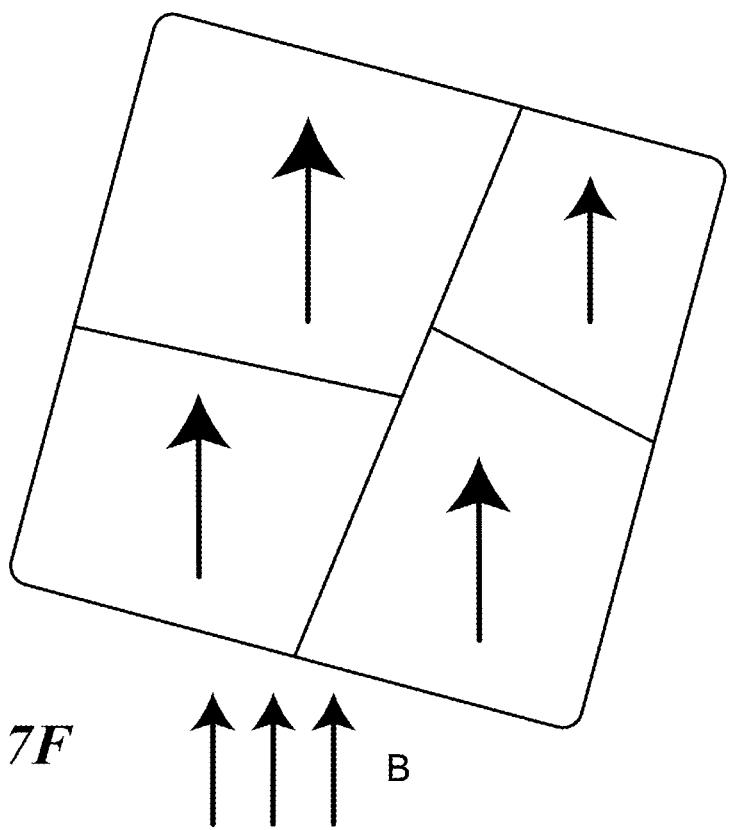

For magnetic nano-particles, such as ferrimagnetic materials, (e.g., $Fe_3O_4$) dispersed in a liquid, Brownian-Néel relaxation (for single domain particles such as superparamagnetic nano-particles) and hysteresis losses (for multi-magnetic domains) are the dominant heating mechanisms, as shown in FIGS. 7A-F. FIG. 7A shows single domain magnetic particles, such as superparamagnetic nano-particles, which are typically 5 nm to 10 nm in size. FIG. 7B shows that under a magnetic field, the magnetic nano-particles physically rotate to facilitate the Brownian relaxation. FIG. 7C shows that in Néel relaxation, the magnetic moment of the nano-particles is rapidly aligned within the domain under an external magnetic field. FIG. 7D shows multi-domain magnetic nano-particles which are usually larger than 100 nm in size. The inset in FIG. 7D shows how the magnetic moment transforms from one domain to another. FIG. 7E shows multi-domain ferromagnetic particles, such as $Fe_3C_{>4}$. The red and blue circles represent the tetrahedral (occupied by $Fe^{3+}$) and octahedral (occupied by both $Fe^{3+}$ and $Fe^{2+}$) sub-lattices in the crystal structure, respectively. FIG. 7F shows application of a magnetic field aligns the magnetic domains inside the nano-material.

In order to achieve heat generation by the magnetic nano-particles, the period of magnetic field oscillation should be shorter than the Brownian relaxation time ($\tau_B$), Néel relaxation time ($\tau_N$), and the overall effective relaxation time, which is $\tau=(1/\tau_B+1/\tau_N)^{-1}$, if both mechanisms are desired. In Brownian relaxation (as shown in FIG. 7B), the nano-particles rotate to align with the applied magnetic field, however, in Néel relaxation (as shown in FIG. 7C) the magnetic moment inside the particle align itself with the applied magnetic field. For multi-domain magnetic particles (as shown in FIG. 7D), the domains are aligned in different directions. However, across the magnetic domain walls magnetization direction gradually aligns with the magnetization of the neighboring domain (FIG. 7D). In multi-domain magnetic particles, when exposed to an oscillating magnetic field, the domain walls jump over the voids and imperfections (known as Barkhausen jumps) and generate the hysteresis heating. Heating power density (a.k.a., Specific Absorption Rate (SAR) and Specific Loss Power (SLP)) in hysteresis heating is proportional to area of the hysteresis in the magnetization (M) vs magnetic field (H) curve and the frequency (f) as the following equation suggests:

$$P_h = \frac{f\mu_o}{\rho_m} \oint M dH \qquad (2)$$

It is observed that particles that exhibit ferromagnetic behavior (i.e., hysteresis), at low magnetic fields (below 5 kA/m or 63 Oe), the $P_h$ scales with $H^3$. This third-order power law is in distinction with the second-order power law for the power scaling with magnetic field in eddy current induction heating mechanism. The magnitude of the generated heat due to hysteresis is proportional to the frequency ($\propto f$), while for eddy current, it is proportional to the square of the frequency ($\propto f^2$). The frequency f≈150 kHz was chosen which provides enough heat for exciting the pneumatic actuator and is easy to generate with high power metal oxide semiconductor field effects (MOSFETs) in a compact circuit.

Example III

Considering the size of the nanoparticles used in Example I (i.e., 200 nm-300 nm), it is hypothesized that hysteresis loss is the dominant heating mechanism. To test this hypothesis, the behavior of heating power was examined as a function of magnetic field. FIG. 8A illustrates the apparatus that was used to measure and characterize the magnetic nanoparticles to examination this behavior. The apparatus included a thermal insulator 804, interrogator 802, optical fiber 806, and gas cube 808, and contained a solution of magnetic nanoparticles 812 mixed in silicone oil 810. FIG. 8B shows a graph of the temperature profile of the magnetic nanoparticles 812 in the silicone oil 810 excited at different magnetic field intensities within the apparatus. FIG. 8C shows a graph of the initial rate of temperature increase as a function of excited magnetic field intensity in the apparatus. Square dots and the dashed-line represent the measure data and fitted model, respectively.

For this Example, the sample was prepared by mixing 1.134 g of the magnetic nanoparticles 812 with 11.25 mL silicone oil 810. For the experiment, 0.6 mL of the resulting solution was transferred to a 1 mL vial and the sample was then placed inside a bigger vial. The gap between the two vials was filled with a thermally insulating material 804 (aerogel). The coil temperature was kept constant at 17° C. during the experiment by running a constant temperature water through the coil (as shown in FIG. 8A). The magnetic field was varied from 7.38 kA/m to 17.45 kA/m at constant frequency of 148 kHz. The measured profiles (from 11 s to 160 s) were fitted with an exponential function in form of:

$$T(t)=T\infty(1-\exp(-t/\tau) \qquad (3)$$

where T∞ is the temperature difference between the vial and the ambient at steady state and $\tau$ is the heating time constant. The rate of increase in temperature right after the excitation can be expressed as:

$$\left(\frac{dT}{dt}\right)_{t=0} = \frac{T_\infty}{\tau} \qquad (4)$$

The $(dT/dt)_{t=0}$ for each temperature profile is plotted as a function of the excited magnetic field and fitted with $(H/a)^n$ (as shown in FIG. 8C). From the fit, n was found to be 4.63 with a=22.3. The value of n, which is greater than 2, suggests that hysteresis loss is the dominant heating mechanism.

The induction heating apparatus used in Example III was based on a Zero Voltage Switching (ZVS) topology. In this circuit (as shown in FIG. 8C), soft switching was used to reduce the voltage/current stress on the MOSFET during on/off transitions by employing a MOSFET that has a fast-body diode across its drain and source. The magnetic nano-particles are represented as a LC circuit in the circuit diagram with R and L representing a heating element and magnetic induction element, respectively.

A copper pipe with outer diameter (OD) of 3/16" (4.7625 mm) and wall thickness of 0.03" (0.762 mm) was used to make the induction heating coil. The coil has 4.5 turns (N) with coil length (L) and coil inner diameter (R) (as shown in FIG. 8B). Water circulation, at constant temperature of 15° C., was used to cool down the coil during the excitation. A magnetic probe (Beehive Electronics 100C) with a spectrum analyzer (RIGOL DSA815) was used to measure the magnetic field along the coil axis. The magnetic field was measured at two voltages: 12V (the minimum voltage needed to excite the circuit) and 33 V. Due to the attenuation limits on the spectrum analyzer and induction heating of the magnetic field probe at high magnetic fields, the magnetic field could only be measured from 150 mm to 20 mm with reference to the edge of the coil.

In order to find the magnitude of the magnetic field inside the coil, the magnetic field was formulated as a function of distance from the center of a coil of width dw from the Biot-Savart as mentioned below:

$$dB_x = \frac{\mu_o(nIdw)}{2} \frac{R^2}{[(x-w)^2 + R^2]^{3/2}} \quad (5)$$

where n=N/L is the number of turns per length of the coil, R is radius of the ring, and I is the current through the ring (FIG. 2A). Integrating equation 1 from a=−L/2 to b=L/2, the $B_x$ was found to be:

$$B_x = \frac{\mu_o nI}{2} R^2 \int_a^b \frac{1}{[(x-w)^2 + R^2]^{3/2}} dw = \quad (6)$$

$$\frac{\mu_o nI}{2}\left(\frac{x-a}{\sqrt{(x-a)^2 + R^2}} - \frac{x-b}{\sqrt{(x-b)^2 + R^2}}\right)$$

Now the magnetic field in the center of the coil to be determined by:

$$B_{x=0} = \mu_o nI \frac{L}{\sqrt{L^2 + 4R^2}} \quad (7)$$

Using the measured data for the amplitude of the magnetic field as a function of distance, equation (4) can be fit to estimate the magnetic field inside the coil to be H≈37 Oe and H≈100 Oe for excitation voltages of 12 V and 33 V, respectively.

Figure 9A:
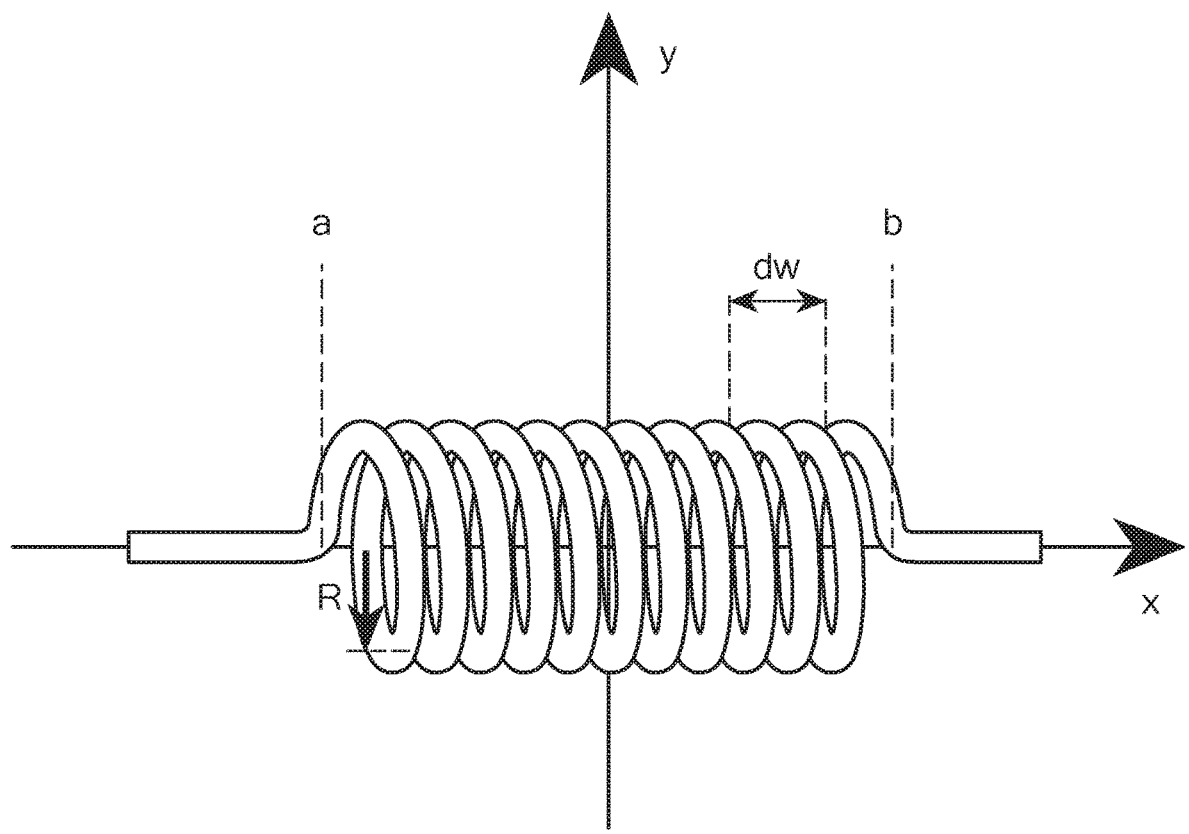
FIG. 9A is a coil used in modeling and testing the actuation mechanism according to embodiments of the present invention.
Figure 9B:
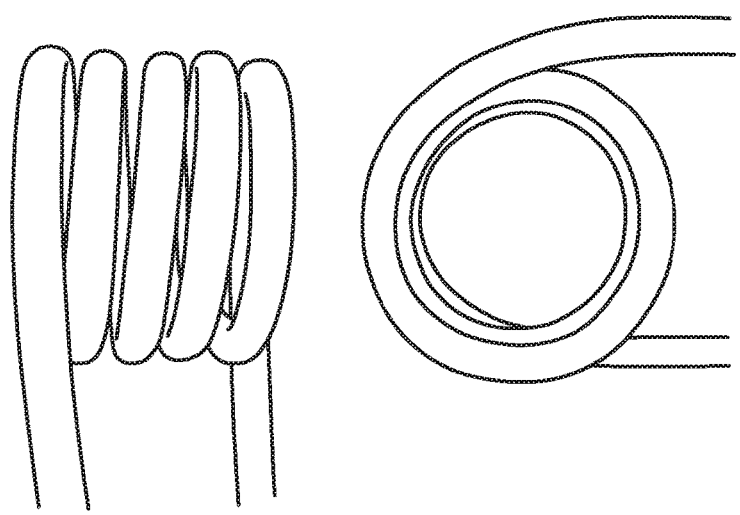
FIG. 9B is a coil used to measure magnetic field characteristics in testing the actuation mechanism according to embodiments of the present invention.
Figure 9C:
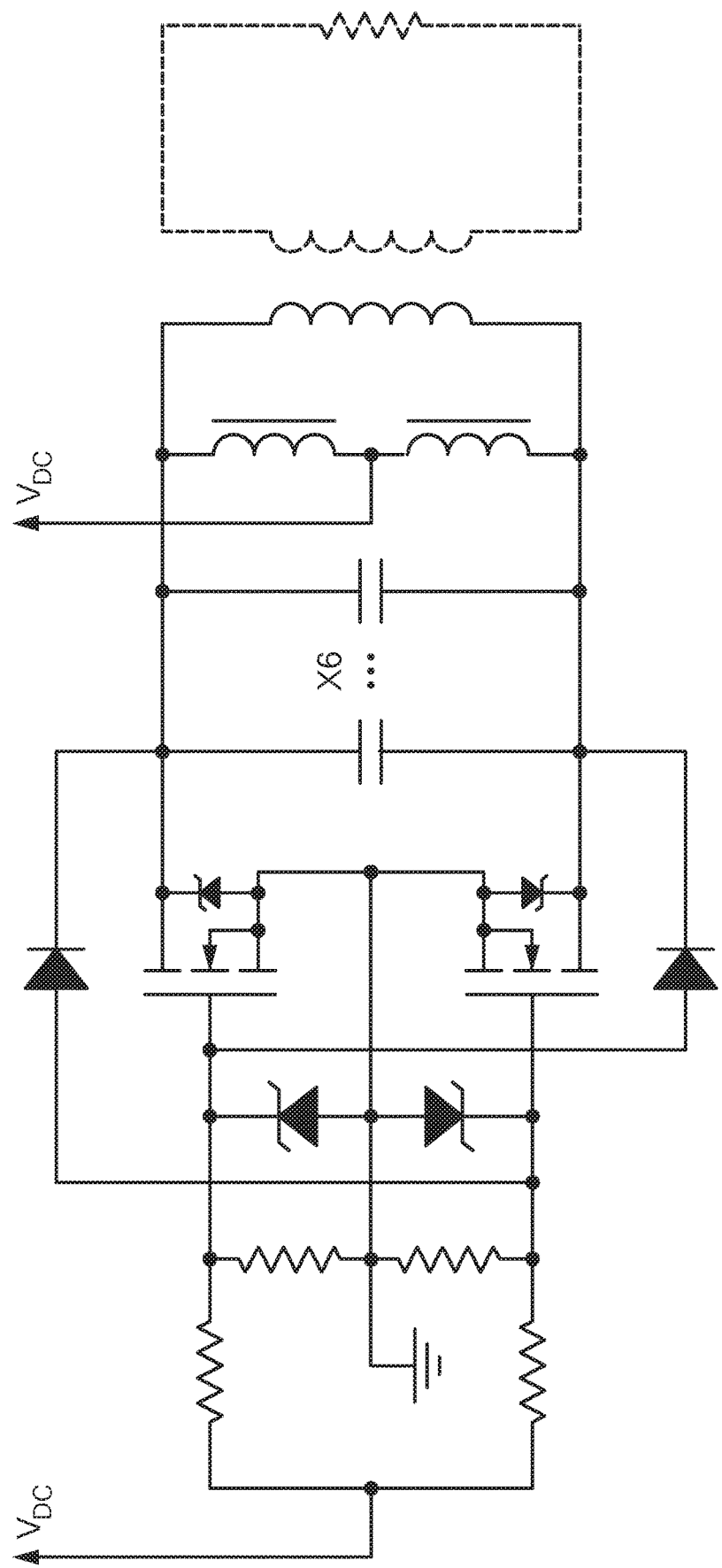
FIG. 9C is a circuit schematic used to generate a high frequency alternating magnetic field for testing the actuation mechanism according to embodiments of the present invention.
Figure 9D:
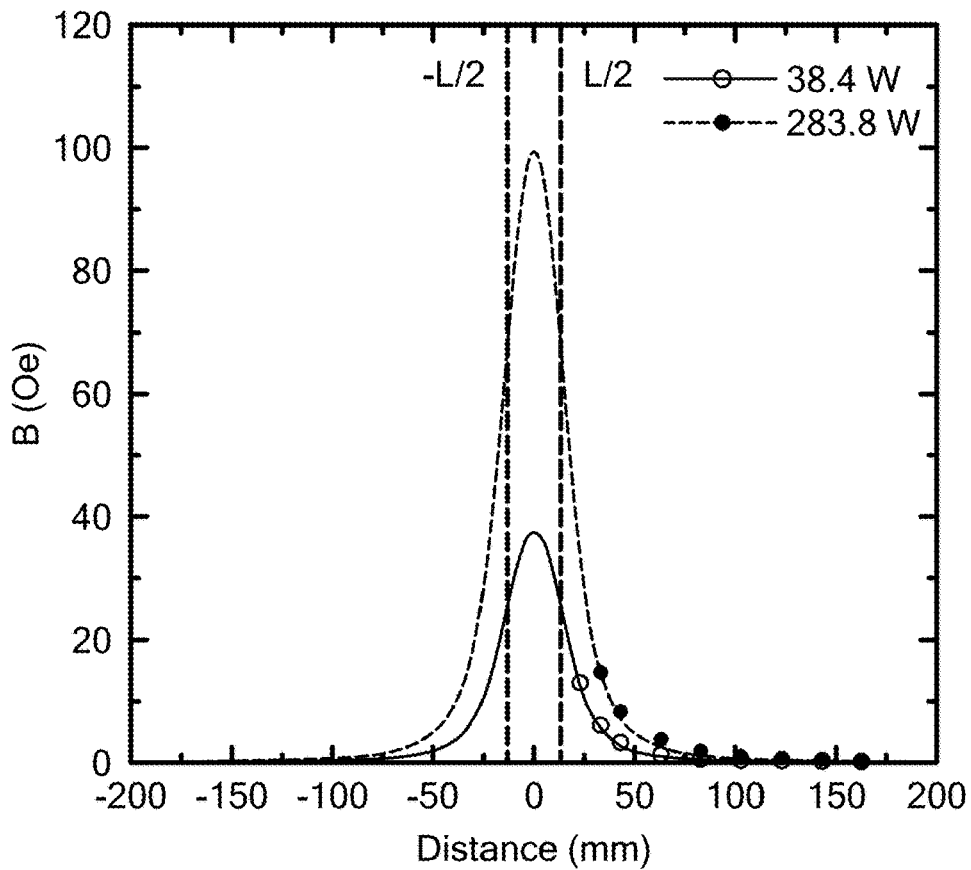
FIG. 9D shows a graph of the magnetic field along the coil axis of the coil of FIG. 9B according to embodiments of the present invention.
Figure 9E:
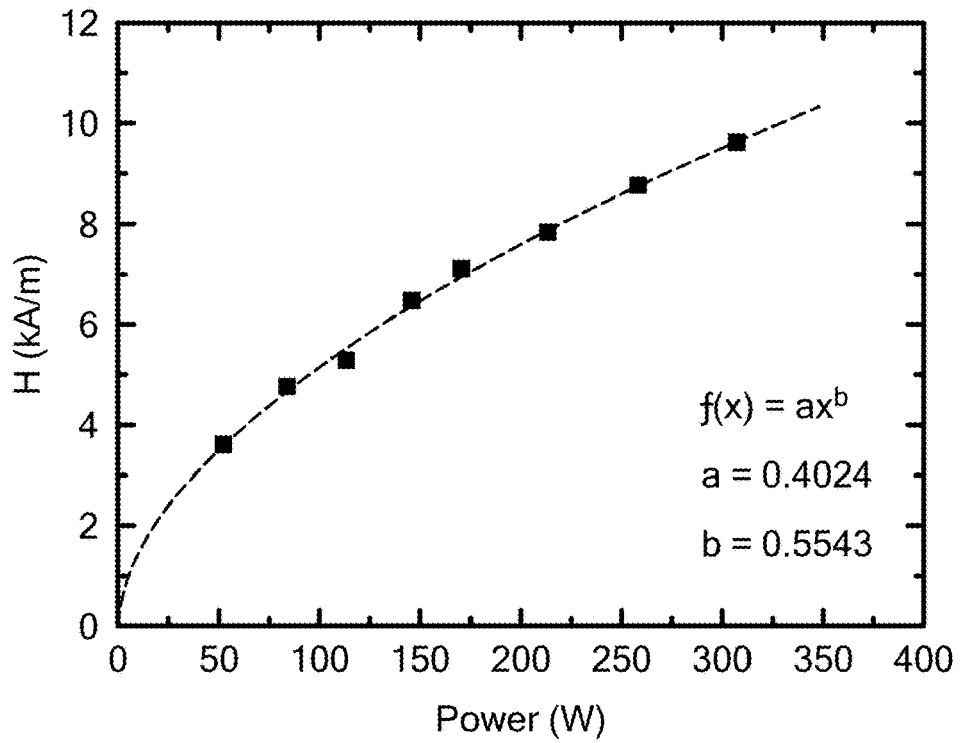
FIG. 9E shows a graph of the magnetic field as a function of the input power for testing the actuation mechanism according to embodiments of the present invention.

FIG. 9A illustrates specifications of the coil that was used for deriving equations 1 and 2. FIG. 9B illustrates the coil used for measuring the magnetic field characteristics along the coil axis. The images are taken before the coils are painted with color to prevent shorting of the coil during experiment. FIG. 9C illustrates the circuit schematic that was used to generate the high frequency alternating magnetic field. Magnetic nano-particles can be modeled as the secondary winding of a "transformer" with the primary winding being the induction coil. FIG. 9D illustrates a magnetic field along the coil axis. The model, equation (4), is fitted to the data to estimate the field inside the coil. FIG. 9D illustrates the magnetic field as a function of the input power.

The current (I) in equation 4, was found by measuring the voltage across the coil and using the following equation (assuming zero resistance across the coil) for impedance to find the current:

$$I = \frac{V}{2\pi fL}, \quad (8)$$

where L is the inductance of the coil which can be found from the resonance frequency of the LC tank (i.e., L=1/C $(2\pi f)^2$).

Fiber optic temperature monitoring technique was used to null the effect of magnetic noise in measuring the temperature, immunity to radio frequency (RF) and microwave radiation.

Output force of a pressure-driven cylindrical actuator, such as McKibben artificial muscle, is related to the contraction strain ($\epsilon$), the differential pressure between the ambient and pressure inside the confined bladder (P), the initial bias angle of the braiding ($\theta_0$), and the initial radius of the muscle ($r_o$) (ref=Tondu and Lopez, 2000) as the following equation suggests:

$$F(P,\epsilon) = (\pi r_0^2)P[a(1-\epsilon)^2 - b] \quad (9)$$

where $a=3/\tan^2(\theta_0)$ and $b=1/\sin^2(\theta_0)$. This model was developed under the assumption of full transmission of the pressure inside the bladder to the external braiding without considering the stiffness of the muscle and geometry variations at both ends of the muscle. At zero strain, the blocking force can be found to be $$F_{block} = (\pi r_0^2)P[a-b]$$

and at zero force, the maximum strain $\epsilon_{max}=1-\sqrt{b/a}$. To account for elasticity of the muscle the term P can be replaced by P−$P_e$ where $P_e$ is the pressure needed to elastically deform the bladder. The effect of the geometry variations at both ends of the muscle can also be included in the model by multiplying the strain with a correction factor k. From the braiding geometry the change in volume within the braided sleeve can be found to be:

$$V(\epsilon) = V_o\left[b(1-\epsilon) - \frac{a}{3}(1-\epsilon)^3\right] \quad (10)$$

where $V_0$ is the initial volume of braided sleeve.

From Maxwell's relations isothermal compressibility (k) can be derived to be:

$$\kappa = -\frac{1}{V}\left(\frac{\partial V}{\partial P}\right)_T \quad (11)$$

which is the fractional change in volume of a system with pressure at constant temperature and can be expressed in terms of the thermal expansion coefficient ($\alpha$) and thermal pressure coefficient ($\gamma$) as:

$$\kappa = \frac{\alpha}{\gamma} \quad (12)$$

where $\alpha$ is defined as the fractional change in the volume of a system with temperature at constant pressure and can be written as:

$$\alpha = \frac{1}{V}\left(\frac{\partial V}{\partial T}\right)_P \quad (13)$$

and $\gamma$ is defined as the fractional change in the pressure of a system with temperature at constant volume and can be written as:

$$\gamma = \left(\frac{\partial P}{\partial T}\right)_V \quad (14)$$

Both α and γ can be determined experimentally. Assuming that k is independent of P and V at low temperature and pressure ranges, equation (9) can be solved and combine with equation (8) to rewrite equation (7) as:

$$F(T, \epsilon) = (\pi r_o^2)\left[\gamma(T - T_o) - \frac{1}{\kappa}\ln\left(b(1-\epsilon) - \frac{a}{3}(1-\epsilon)^3\right)\right][a(1-\epsilon)^2 - b] \quad (15)$$

where $T_0$ is the temperature at $P=P_D$ and $V=V_0$. First the block force ($F_{block}$) was measured under isometric conditions (FIG. 10A) and equation (7) was used to find the pressure. γ is the slope of the differential pressure (ΔP) vs temperature (T) curve (as shown in FIG. 10B). Similarly, by increasing the temperature under isotonic conditions, the α can be found to be the slope of the normalized change in volume ($\Delta V/V_0$) vs temperature (T) (as shown in FIG. 10).

Figure 10A:
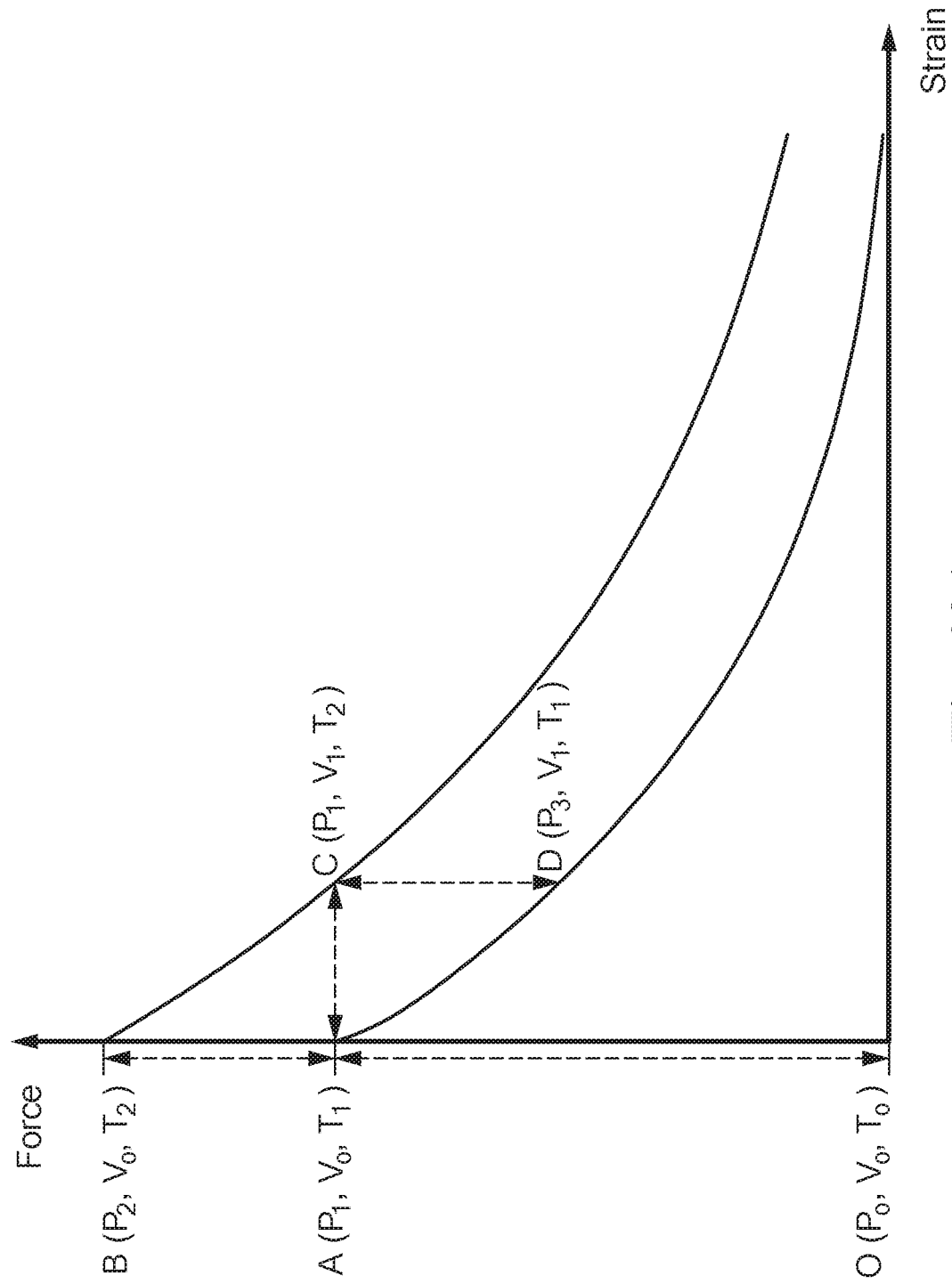
FIG. 10A shows a graph of force versus strain of an apparatus according to embodiments of the present invention at two different temperature profiles.
Figure 10B:
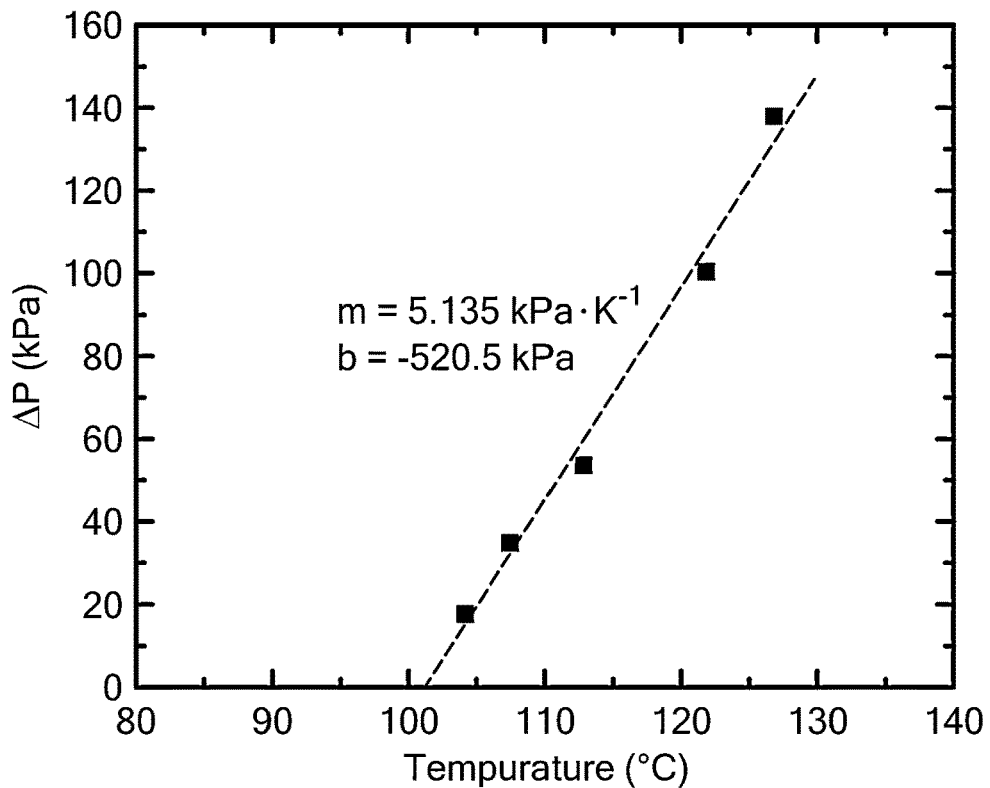
FIG. 10B shows a graph of the change in differential pressure as a function of temperature in the apparatus of FIG. 10A.
Figure 10C:
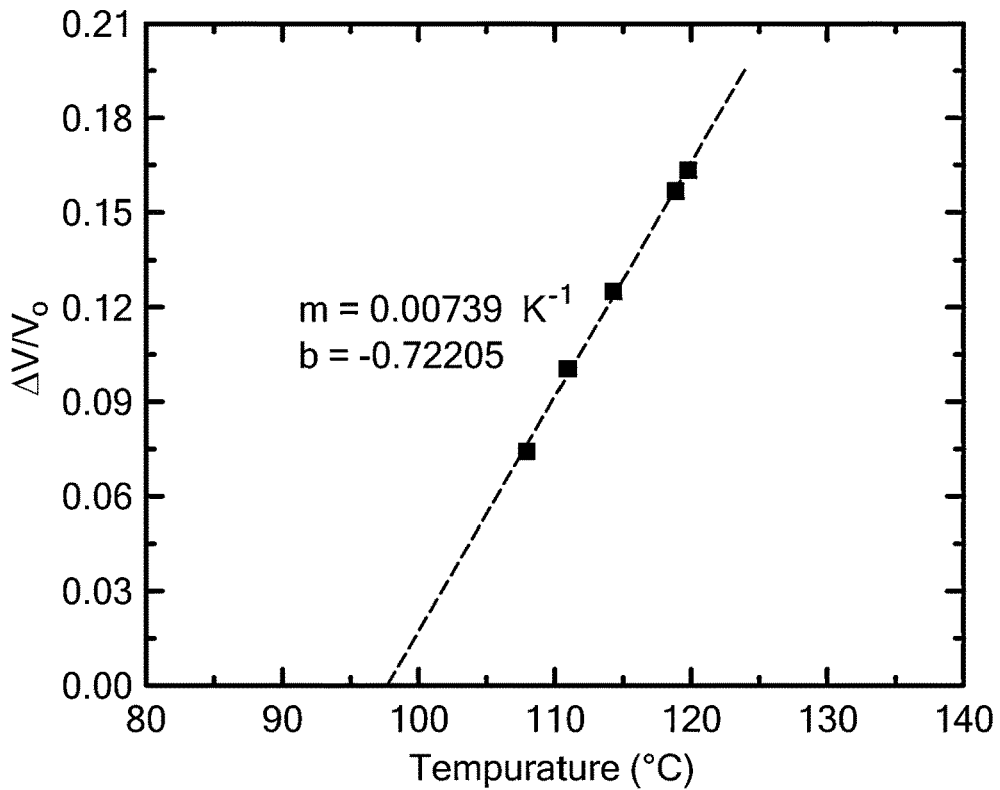
FIG. 10C shows a graph of the change in volume as a function of temperature in the apparatus of FIG. 10A.

FIG. 10A is a graph illustrating force vs strain for a device made according to Example III excited at temperatures $T_1$ and $T_2$. From state O to A and then B, the temperature of the muscle increases under an isometric condition (constant volume/strain). From state B to C, while the muscle is under excitation (constant T), the strain increases when the load decreases. From state C to A, the strain decreases under an isotonic (constant load) condition by reducing the excitation temperature (T). FIG. 10B shows a graph of the change in differential pressure as a function of temperature in the device. FIG. 10C shows a graph of the change in volume as a function of temperature in the device.

The embodiments of the invention described herein are intended to be merely exemplary; variations and modifications will be apparent to those skilled in the art. All such variations and modifications are intended to be within the scope of the present invention as defined in any appended claims.

What is claimed is:

1. A wireless actuation system, the system comprising
a device for wireless actuation, the device comprising:
    a bladder having an inner surface and an outer surface, the inner surface forming an interior area, the bladder configured to expand or retract so as to change an area of the interior area;
    a plurality of magnetic particles suspended in a fluid medium and disposed within the interior area, the plurality of magnetic particles configured to react to an alternating magnetic field which causes a phase transition to the fluid medium within the interior area and causes the bladder to expand; and
    a sleeve disposed on the outer surface of the bladder, the sleeve configured to confine the bladder so as to generate actuation from the expansion or retraction of the bladder; and
a magnetic field generator configured to generate an alternating magnetic field.

2. The system of claim 1, wherein the plurality of magnetic particles are configured to heat in reaction to the alternating magnetic field and the heat of the magnetic particles causes the phase transition to the fluid medium.

3. The system of claim 2, wherein the plurality of magnetic particles are heated by the alternating magnetic field inducing a current within a set of the plurality of magnetic particles.

4. The system of claim 2, wherein the phase transition includes generating steam within the interior area by the heated magnetic particles boiling the fluid medium within the interior area, such that the steam causes the bladder to expand within the sleeve.

5. The system of claim 4, wherein the bladder is expanded due to pressure caused by the steam within the interior area, and due to confinement of the bladder within the sleeve, the expansion or retraction of the bladder generates the actuation.

6. The system of claim 1, wherein the sleeve is made of braided carbon fiber.

7. The system of claim 1, wherein the plurality of magnetic particles are coated with a coating material to prevent agglomeration.

8. The system of claim 7, wherein the coating material includes methoxy-PEG-silane.

9. A method of wireless actuation, the method comprising:
    providing (i) a bladder having an inner surface and an outer surface, the inner surface forming an interior area, the bladder configured to expand or retract so as to change an area of the interior area, (ii) a plurality of magnetic particles suspended in a fluid medium and disposed within the interior area, and (iii) a sleeve disposed on the outer surface of the bladder;
    exciting the plurality of magnetic particles by application of an alternating magnetic field to which the plurality of magnetic particles react; and
    causing, by the excited magnetic particles, a phase transition to the fluid medium within the interior area which causes the bladder to expand, such that the sleeve confining the bladder generates actuation from the expansion or retraction of the bladder.

10. The method of claim 9, wherein exciting includes heating the magnetic particles in reaction to the alternating magnetic field and the heat of the magnetic particles causes the phase transition to the fluid medium.

11. The method of claim 9, wherein the plurality of magnetic particles are heated by the alternating magnet field inducing a current within a set of the plurality of magnetic particles.

12. The method of claim 9, wherein the phase transition includes generating steam in the interior area by the heated magnetic particles boiling the fluid medium in the interior area, such that the steam causes the bladder to expand within the sleeve.

13. The method of claim 12, wherein the bladder is expanded due to pressure caused by the steam within the interior area, and due to confinement of the bladder within the sleeve, the expansion or retraction of the bladder generates the actuation.

14. The method claim 9, wherein the plurality of magnetic particles are microparticles or nanoparticles.

15. The method of claim 9, wherein the plurality of magnetic particles comprise one or more of: iron, iron oxide, nickel, nickel oxide, cobalt and/or cobalt oxide.

16. The method of claim 9, wherein the plurality of magnetic particles comprise $Fe_3O_4$.

17. The method of claim 9, wherein the sleeve is made of braided carbon fiber.

18. The method of claim 9, wherein the plurality of magnetic particles are coated with a coating material to prevent agglomeration.

19. The method of claim 18, wherein the coating material includes methoxy-PEG-silane.

* * * * *